(12) United States Patent
Takei

(10) Patent No.: US 9,722,687 B2
(45) Date of Patent: *Aug. 1, 2017

(54) POLARIZATION-ANGLE-DIVISION DIVERSITY WIRELESS TRANSMITTER, WIRELESS RECEIVER, AND WIRELESS COMMUNICATION SYSTEM

(71) Applicant: HITACHI, LTD., Tokyo (JP)

(72) Inventor: Ken Takei, Kawasaki (JP)

(73) Assignee: HITACHI, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/094,698

(22) Filed: Apr. 8, 2016

(65) Prior Publication Data

US 2016/0226571 A1   Aug. 4, 2016

Related U.S. Application Data

(63) Continuation of application No. 14/002,521, filed as application No. PCT/JP2011/055462 on Mar. 9, 2011, now Pat. No. 9,407,349.

(51) Int. Cl.
| | | |
|---|---|---|
| H04B 7/02 | (2017.01) | |
| H04B 7/08 | (2006.01) | |
| H04B 7/10 | (2017.01) | |
| H04B 7/06 | (2006.01) | |
| H04L 27/18 | (2006.01) | |

(52) U.S. Cl.
CPC ............ *H04B 7/10* (2013.01); *H04B 7/0613* (2013.01); *H04B 7/08* (2013.01); *H04B 7/0894* (2013.01); *H04L 27/18* (2013.01)

(58) Field of Classification Search
CPC ....... H04B 7/10; H04B 10/532; H04B 14/008
See application file for complete search history.

(56) References Cited

U.S. PATENT DOCUMENTS

| | | | |
|---|---|---|---|
| 5,842,135 A | 11/1998 | Ishijima | |
| 9,407,349 B2 * | 8/2016 | Takei | ........................ H04B 7/10 |
| | (Continued) | | |

FOREIGN PATENT DOCUMENTS

| | | |
|---|---|---|
| JP | 64-077230 A | 3/1989 |
| JP | 01-135135 A | 5/1989 |
| | (Continued) | |

*Primary Examiner* — David S Huang
(74) *Attorney, Agent, or Firm* — Volpe and Koenig, P.C.

(57) ABSTRACT

A wireless transmitter has a modulator modulating an information signal of a frequency f1 by a carrier wave of a frequency f2 to output a first modulated signal, a transmitting antenna transmitting the first modulated signal using a linearly polarized wave, and a motor rotating the transmitting antenna at a frequency f3 to rotate the outgoing linearly polarized wave at the frequency f3 thereby multiplexing the first modulated signal with a linearly polarized wave component and a horizontally polarized wave component, the two components being independent of each other. A wireless receiver has diversity receiving antennas receiving the signal on a plurality of polarization planes to obtain a plurality of input signals; a path difference phase shifter compensating each of the input signals for the phase shift stemming from path differences, and a composer composing the corrected received signals.

2 Claims, 15 Drawing Sheets

(56) References Cited

U.S. PATENT DOCUMENTS

| | | | |
|---|---|---|---|
| 2001/0003442 A1* | 6/2001 | Smith | H04B 7/10 342/365 |
| 2003/0129959 A1 | 7/2003 | Gilmore | |
| 2004/0235433 A1* | 11/2004 | Hugl | H04B 7/0608 455/101 |
| 2005/0162332 A1 | 7/2005 | Schantz | |
| 2006/0013335 A1 | 1/2006 | Leabman | |
| 2006/0234662 A1 | 10/2006 | Diloisy | |
| 2007/0116162 A1 | 5/2007 | Eliaz et al. | |
| 2007/0252992 A1 | 11/2007 | Itsuji | |
| 2012/0142397 A1* | 6/2012 | Jordan | G01S 5/02 455/556.1 |

FOREIGN PATENT DOCUMENTS

| | | |
|---|---|---|
| JP | 02-291731 A | 12/1990 |
| JP | 04-043271 U | 4/1992 |
| JP | 06-061894 A | 3/1994 |
| JP | 08-340290 A | 12/1996 |
| JP | 10-135919 A | 5/1998 |
| JP | 2006-508578 A | 3/2006 |
| JP | 2008-182717 A | 8/2008 |
| JP | 2012-129694 A | 7/2012 |

* cited by examiner

FIG. 3A
FIG. 3B
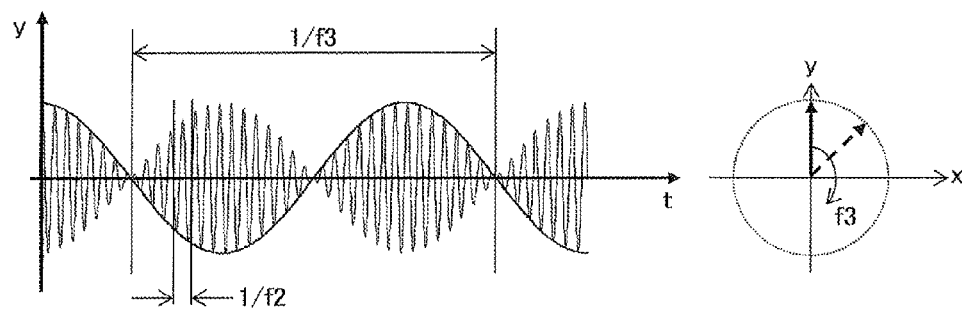
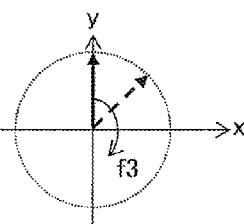
FIG. 3C
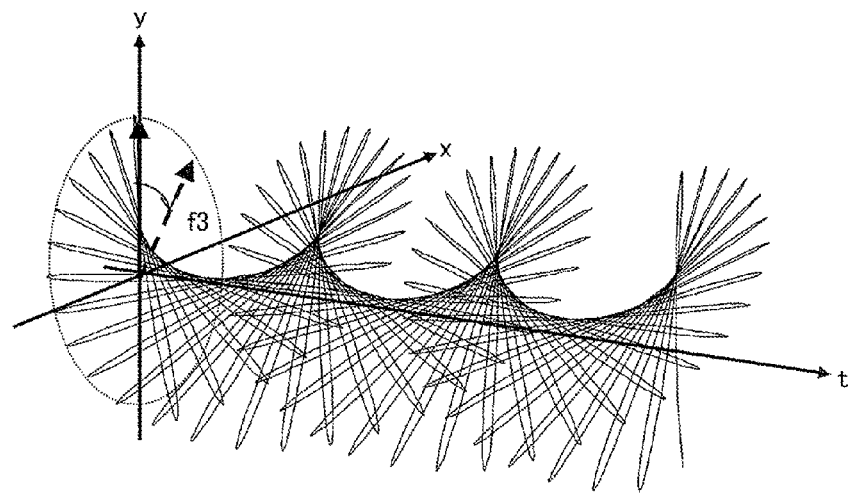

POLARIZATION-ANGLE-DIVISION DIVERSITY WIRELESS TRANSMITTER, WIRELESS RECEIVER, AND WIRELESS COMMUNICATION SYSTEM

TECHNICAL FIELD

The present invention relates to a polarization-angle-division diversity wireless transmitter, a wireless receiver, and a wireless communication system for providing highly reliable wireless communication.

BACKGROUND ART

In recent years, wireless communication technology has had significant progress in the fields of broadcasting and communication and has overcome reliability-related problems such as momentary disconnections specific to wireless communication. Accordingly, wireless communication technology has increasingly found its way into the fields of control and measurement in which higher reliability is required than in the fields of broadcasting and communication.

Particularly in the fields of control and measurement, the equipment making up social infrastructure (called the social infrastructure equipment hereunder) is required to ensure higher reliability of communication quality and of communication hardware (i.e., longer service life) than general commercial equipment in the fields of broadcasting and communication. The social infrastructure equipments are, for example, an elevator system shown in FIG. 14 and a transformation installation monitoring system in FIG. 15.

Compared with general commercial equipment, the social infrastructure equipment is overwhelmingly large in size and is built sturdily using metallic members. The social infrastructure equipment itself can a scatter electromagnetic waves. Thus the wireless communication amid the social infrastructure equipment often carried out in an environment in which multiple waves (multiple passes) generated due to scattering interfere with one another. For this reason, it has been desired to provide a highly reliable wireless communication even in the environment where multiple-wave (multi-pass) interference occurs.

A plurality of electromagnetic waves have their electromagnetic wave energies cancelled out through interference therebetween when a difference in the distance between a transmitting point and a receiving point of the waves is an odd multiple of a half wavelength of another wave, which makes communication impossible. Conventionally, this problem was circumvented using a spatial diversity technique whereby a plurality of antennas are installed a half wavelength apart in space. The spatial diversity technique involves setting up multiple antennas so that when the electromagnetic wave energy received by one antenna is cancelled, the electromagnetic wave energy received by another antenna a half wavelength apart is increased by interference, whereby either of antennas can accomplish successful reception.

In the social infrastructure equipment, the electromagnetic wave generated by a wireless transmitter is reflected by the social infrastructure equipment itself to become multiple waves (multiple passes) that can reach a receiver in all directions. Thus when the spatial diversity technique is used, numerous antennas are needed. For example, even if it is assumed that multiple waves (multiple passes) are restricted to arriving in a planar direction, a plurality of arranged antennas need to be prepared. Since the distance between adjacent antennas is a half wavelength of the electromagnetic wave to be received, the dimensions of the antennas can exceed the size of an installation acceptable for the social infrastructure equipment.

The abstract and FIG. 3 of Patent document 1 (JP-10 (1998)-135919-A) disclose a technique for rotating a radio wave polarization plane to suppress the effects of fading and noise in wireless communication. Furthermore, paragraph 0006 in the specification of Patent Document 1 discloses that "there are at least provided two pairs of dipole antennas positioned perpendicular to each other and extending at right angle in the transmitting direction so as to rotate a radio wave polarization plane for transmission, and a transmitter having two sets of balanced modulated wave output to excite the antennas on the transmitting side; and a receiver for detecting and receiving the rotating polarization plane of the incoming radio wave on the receiving side."

In Patent Document 2 (JP-2(1990)-291731-A), on page 184, from line 13 in the top right block to line 2 in the bottom left block, a technique is disclosed for rotating the radio wave polarization plane so as to eliminate the effects of fading in wireless communication and thereby to transmit and receive high-quality signals. An application example 6 described in Patent Literature 2, on page 192, from line 13 in the top left block to line 12 in the top right block, discloses a technique for adding or subtracting the frequency of polarization plane revolutions to or from the carrier frequency, thereby achieving long-wavelength transmission using small (short) antennas.

PRIOR ART LITERATURE

Patent Literature

Patent Document 1: JP-10(1998)-135919-A
Patent Document 2: JP-2(1990)-291731-A

SUMMARY OF THE INVENTION

Problem to be Solved by the Invention

The invention of Patent Document 1 is effective for eliminating the effects of fading and noise generated in the transmission and reception of radio waves. However, the description of this invention has no description of providing a highly reliable wireless communication in the environment where interference between multiple waves (multiple passes) is taking place, or of reducing the transmitting or receiving antennas in size.

The invention of Patent Literature 2 is effective for eliminating the effects of fading in wireless communication for transmitting and receiving high-quality signals as well as for reducing the transmitting or receiving antennas in size. However, the description of this invention has no mention of implementing highly reliable wireless communication in the environment where interference between multiple waves (multiple passes) is occurring.

Thus an object of the present invention is to provide a polarization-angle-division diversity wireless transmitter, a wireless receiver, and a wireless communication system for implementing highly reliable wireless communication using small-size transmitting and receiving antennas in the environment where interference between multiple waves (multiple passes) is taking place.

Means for Solving the Problem

In order to solve the above-mentioned problem and to achieve the object of the present invention, the following structure is provided:

That is, according to the present invention, there is provided a polarization-angle-division diversity wireless transmitter including first modulating for modulating an information signal having a first frequency by a second frequency to output a first modulated signal, and electromagnetic wave transmitting means which transmits the first modulated signal using two independent polarized waves and multiplies the polarized waves by a third frequency.

The other means will be explained in connection with examples in which the invention is implemented.

Advantageous Effects of Invention

According to the present invention, there may be provided a polarization-angle-division diversity wireless transmitter, a wireless receiver, and a wireless communication system for providing a highly reliable wireless communication using small-size transmitting and receiving antennas in the environment where interference between multiple waves (multiple passes) is taking place.

BRIEF DESCRIPTION OF THE DRAWINGS

FIGS. 3A to 3C are charts showing operations of the wireless communication system according to the first embodiment.

MODE FOR CARRYING OUT THE INVENTION

Embodiments of the present invention (called this embodiment hereunder) will be explained below in detail by reference to the accompanying drawings and others.

<<About Polarization of the Electromagnetic Wave>>

The embodiments of this invention utilize polarized electromagnetic waves in order to provide a polarization-angle-division diversity wireless transmitter, a wireless receiver, and a wireless communication system for providing a highly reliable wireless communication using small-size transmitting and receiving antennas in the environment where interference between multiple waves (multiple passes) is taking place.

Figure 2:
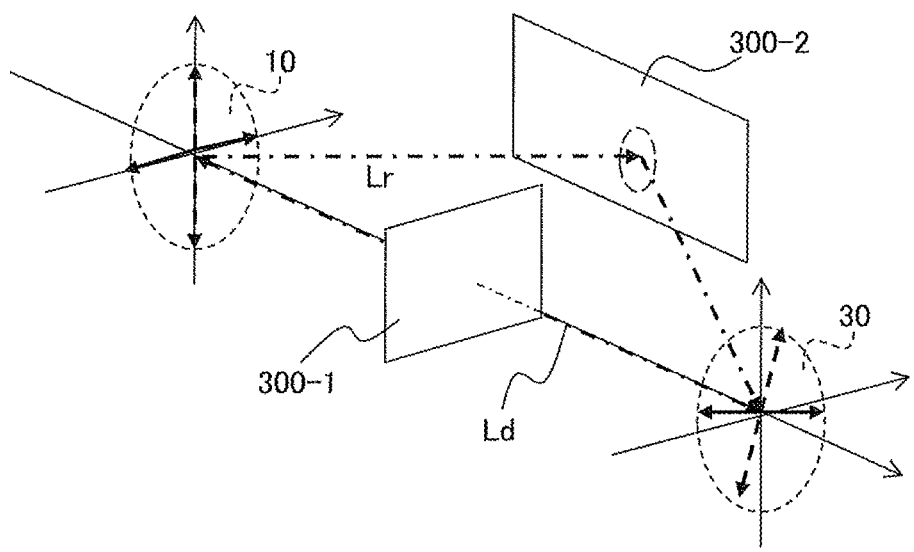
FIG. 2 is an illustration showing multiple passes of the wireless communication system.

FIG. 2 is an illustration showing multiple passes of the wireless communication system.

This communication system includes a wireless transmitter and a wireless receiver 30. The wireless transmitter 10 transmits two independent linearly polarized waves that are orthogonal to each other. An electromagnetic wave reflector 300-1 blocks a path from the wireless transmitter 10 to the wireless receiver 30. However, the electromagnetic wave transmitted by the wireless transmitter 10 is reflected by another electromagnetic wave reflector 300-2 to reach the wireless receiver 30. When reflected by the electromagnetic wave reflector 300-2, this electromagnetic wave propagates along a path length Lr so that this wave is phase-shifted with the wave propagating along the shortest path length Ld from the wireless transmitter 10 to the wireless receiver 30, by Φ given by the following equation:

$$\Phi = ((Lr - Ld) \div \lambda) \times 2\pi \qquad \text{Eq. (1)}$$

where, λ denotes the wavelength of the electromagnetic wave. The wavelength λ of the electromagnetic wave is calculated using the following Eq. (2).

$$\lambda = c \div f \qquad \text{Eq. (2)}$$

where, c denotes the speed of light and f represents the frequency of the electromagnetic wave.

Further, when the electromagnetic wave is reflected by the electromagnetic wave reflector 300-2, a polarization plane of the electromagnetic wave is shifted by θ in phase. For example, when the polarization plane is reflected perpendicularly to the tangent plane of the electromagnetic wave reflector 300-2, the phase shift θ of the polarization plane is 0 degrees. When the polarization plane is reflected in parallel with the tangent plane of the electromagnetic wave reflector 300-2, the phase shift θ of the polarization plane is 180 degrees. That is, the phase shift θ of the polarization plane of the reflected wave is generated in accordance with the angle at which the polarized electromagnetic wave is incident to the electromagnetic wave reflector 300-2.

Furthermore, when the electromagnetic wave transmitted from the wireless transmitter 10 is also reflected by an n-th electromagnetic wave reflector, the wave propagates along a different path length Ln to incur a phase shift of Φn. Here, Φn is calculated using the following Eq. (3):

$$\Phi n = ((Ln - Ld) \div \lambda) \times 2\pi \qquad \text{Eq. (3)}$$

Moreover, when each polarization plane of the electromagnetic wave is reflected from the tangent plane of the n-th electromagnetic wave reflector, the phase shift θ of the polarization plane is generated on each reflected wave.

When the electromagnetic wave transmitted from the wireless transmitter 10 reaches the wireless receiver 30 through n paths from n electromagnetic wave reflectors on n paths, the resulting polarized waves each having a different phase shift θn of the polarization plane are detected per path and separated from one another. The polarized waves are further corrected for the phase shift Φn per path before being combined. This makes it possible to avoid the phenomenon in which multiple wave (multiple paths) interference causes the electromagnetic wave energy to become zero.

Furthermore, when the polarization of the transmitted electromagnetic wave are rotated in this state, the rotating direction of the polarized waves resulting from radio wave reflection from the electromagnetic wave reflectors is changed, and so are the paths are also changed at the same time. In this case, except under a special condition, the polarization planes of the electromagnetic waves interfering with each other at the point of reception vary over time. Since the polarized electromagnetic waves are transmitted independently of one another, the electromagnetic wave energy at the point of reception is not zero. Two independent polarized waves orthogonal to each other can be transmitted using, for example, two vertical polarization antennas positioned orthogonally to each other. These two antennas need not be separated spatially and can be installed in the smallest possible area. Incidentally, the special condition is a condition in which polarization of the transmitted electromagnetic wave is rotated upon polarization have their electromagnetic wave energy momentarily nullified at the point of reception, with negligibly small effects on information transmission.

(Structure of the First Embodiment)

Figures 1A, 1B:
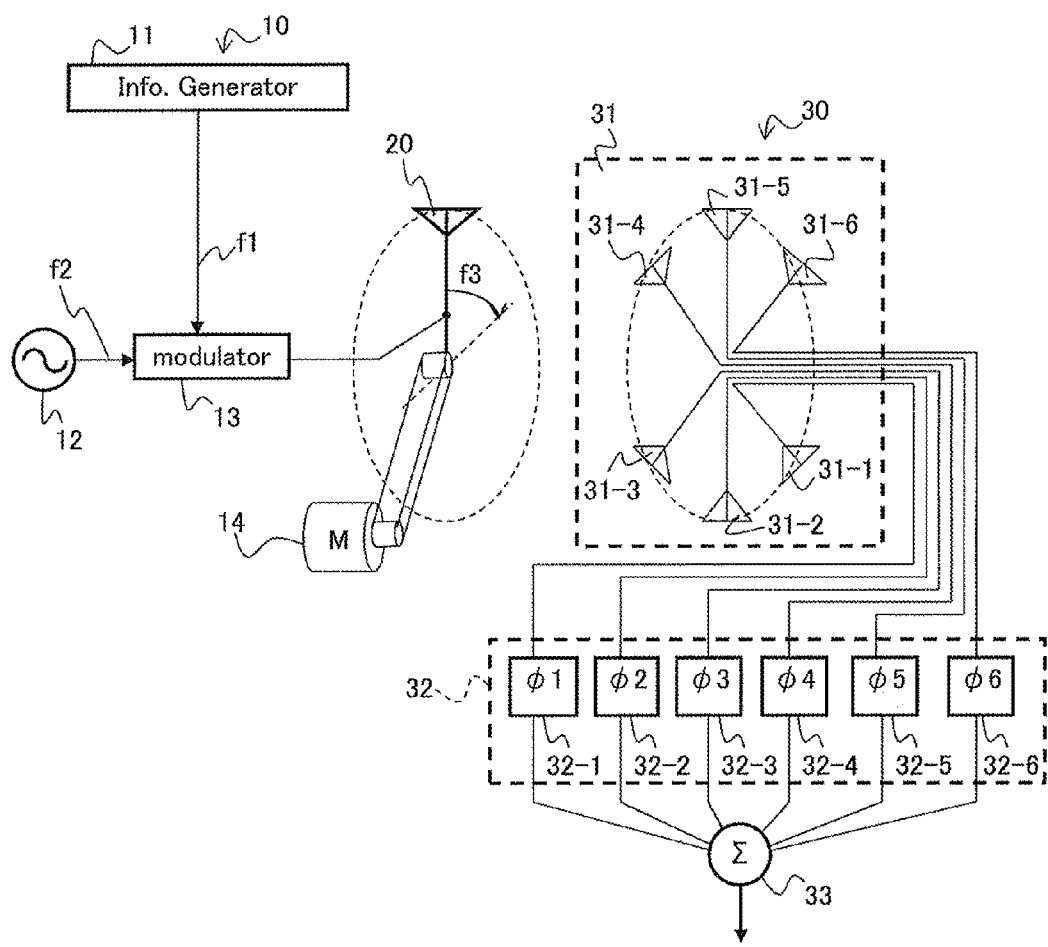
FIGS. 1A and 1B are general block diagrams of a wireless communication system according to a first embodiment.

FIGS. 1A and 1B are general block diagrams of a wireless communication system. FIG. 1A shows the structure of the wireless transmitter 10, and FIG. 1B indicates the structure of the wireless receiver 30.

The wireless communication system of this embodiment includes the wireless transmitter 10 and wireless receiver 30.

The wireless transmitter 10 shown in FIG. 1A includes an information generation circuit 11, an oscillator 12, a modulator 13 acting as first modulating means, a transmitting antenna 20 as electromagnetic wave transmitting means, and a motor 14 as rotating means.

An output side of the information generation circuit 11 and an output side of the oscillator 12 are connected to the modulator 13. The output side of the modulator 13 is connected to the transmitting antenna 20.

The information generation circuit 11 has a function of outputting to the modulator 13 an information signal of a frequency band f1 as a first frequency.

The oscillator 12 has a function of outputting to the modulator 13 a carrier wave f2 as a second frequency.

The modulator 13 has the function of modulating the information signal of the frequency band f1 by the carrier wave f2 and outputting the resulting signal as a first modulated signal to the transmitting antenna 20.

The transmitting antenna 20 has a function of transmitting a linearly polarized wave. The motor 14 has the function of rotating the transmitting antenna 20 in a (1/f3) cycle, i.e., at a frequency f3.

The wireless receiver 30 shown in FIG. 1D includes a diversity receiving antenna 31 including a plurality of receiving antennas 31-1 to 31-6, path difference phase shifters 32 (=32-1 to 32-6) as a plurality of signal correcting means, and a composer 33 as composing means.

The receiving antennas 31-1 to 31-6 are arranged in rotational symmetry at an angle of 60 degrees to one another, and each have the function of receiving a linearly polarized wave having the angle of 60 degrees. The receiving antennas 31-1 to 31-6 are connected to the path difference phase shifters 32-1 to 32-6, respectively.

The outputs of the path difference phase shifters 32 (=32-1 to 32-6) are all connected to the composer 33.

The receiving antennas 31-1 to 31-6 each have the function of receiving a linearly polarized wave having a predetermined angle. The path difference phase shifters 32 (=32-1 to 32-6) each have the function of correcting the phase shift of each input signal caused by the path difference to output the signal. The composer 33 has the function of composing all input signals for output. In this embodiment, the phase shifts $\Phi 1$ to $\Phi n$ due to the path differences of the electromagnetic waves denote the phase shifts of the frequency f2.

(Operation of the First Embodiment)

FIGS. 3A to 3C are charts showing operations of the wireless communication system according to the first embodiment FIG. 3A is an illustration showing a variation on the y-axis of an electromagnetic wave transmitted from the transmitting antenna 20 (FIG. 1) over time. The horizontal axis represents time t and the vertical axis represents y-axis coordinates. The electromagnetic wave transmitted from the transmitting antenna 20 vibrates in a (1/f2) cycle by the carrier wave f2. Further, because the transmitting antenna 20 is rotated at the frequency f3, the polarization plane of the electromagnetic wave transmitted from this transmitting antenna 20 rotates in a (1/f3) cycle.

The frequency f1 as the first frequency is set to be lower than the carrier wave frequency f2 as the second frequency as well as the frequency f3 as the third frequency. The carrier wave frequency f2 is set to be higher than the frequency f3.

FIG. 3B is an illustration showing an rotating operation of the transmitting antenna 20 rotates on an x-y plane at the frequency f3. The transmitting antenna 20 rotates clockwise on the x-y plane at the frequency f3. The rotation causes the polarization plane of the electromagnetic wave to rotate at the frequency f3.

FIG. 3C is a three-dimensional diagram showing a variation of an electromagnetic wave transmitted by the transmitting antenna 20 changes over time on the x-y plane. The coordinates on the x-axis, y-axis and t-axis are shown three-dimensionally, with a dotted-line arrow indicating on the x-y plane the rotating direction of the antenna shown in FIG. 3B. The polarization plane of the electromagnetic wave is shown by the waveform of the frequency f2. Because the polarization plane indicated by the waveform of the frequency f2 rotates on the x-y plane at the frequency f3, the variation of an envelope curve over time take on a spiral shape in an x-y-t space.

When an electromagnetic wave emitted from the wireless transmitter 10 is reflected on its way to reaching the wireless receiver 30 by an electromagnetic wave reflector, not shown, the polarization plane of the electromagnetic wave is rotated in accordance with an incident angle to the electromagnetic wave reflector. Thus if there exist a plurality of electromagnetic wave reflectors in a space where the wireless transmitter 10 and wireless receiver 30 are installed, a plurality of electromagnetic waves on different paths with different polarization planes are received. The polarization planes of these electromagnetic waves change over time at the frequency f3.

Suppose that, at a given moment, two reflected waves (electromagnetic waves) having a path difference of a half wavelength and arriving at a single receiving antenna 31-1 interfere with each other resulting in the phenomenon of their electromagnetic wave energy becoming zero. In this case, however, the receiving antennas 31-2 to 31-6 are set up in rotational symmetry at different angles to the receiving antenna 31-1. One of the electromagnetic waves reaching the receiving antennas 31-2 to 31-6 arrives from a different path, so that radio wave interference does not occur and the phenomenon of the electromagnetic wave energy becoming zero will not take place.

Furthermore, since the polarization plane of the electromagnetic wave transmitted from the wireless transmitter is rotated, even if interference occurs on the receiving antenna 31-1, the path of the electromagnetic wave arriving at the receiving antenna 31-1 changes at the next moment and thus radio wave interference does not take place.

The wireless receiver 30 of this embodiment receives a plurality of electromagnetic waves arriving with different polarization angles using the diversity receiving antennas 31 for receiving a plurality of different polarized waves. Even if, at a given moment, the receiving antenna 31-1 incurs radio wave interference and undergoes the phenomenon of the electromagnetic wave energy becoming zero, any one of the other receiving antennas 31-2 to 31-6 is not subject to radio wave interference in many cases.

The multiple receiving antennas 31-1 to 31-6 receive electromagnetic waves with different polarization planes, the path difference phase shifters 32 correct the phase shifts Φ1 to Φn of the received electromagnetic waves caused by their path differences, and the composer 33 composes the corrected signals. This makes it possible to improve reception sensitivity and boost the reliability of wireless communication.

For example, when the phase shift $\Phi i$ of the carrier wave f2 is to be corrected, the path different phase shifters 32-$i$ (i=1 to 6) delay the input signal by $t0-(\Phi i \div (2\pi \times f2))$, where t0 is a constant.

Moreover, in this embodiment, the rotating frequency f3 of the polarization plane of the electromagnetic wave is set to be higher than the frequency band f1 for transmitting information signals. By further processing the composed received signals with a (1/f3) time resolution, the wireless receiver 30 can avert the phenomenon of the electromagnetic wave energy becoming zero and receive the information signal on the frequency band f1 without error.

(Advantageous Effects of the First Embodiment)

The first embodiment explained above provides the following advantageous effects (A) to (D):

(A) Because the polarization plane of the electromagnetic wave transmitted from the wireless transmitter 10 is rotated, even if the receiving antenna 31-1 incurs interference at a given moment, the path of the electromagnetic wave reaching the receiving antenna 31-1 changes at the next moment, which eliminates radio wave interference. This makes it possible to avoid the phenomenon of the electromagnetic wave energy becoming zero.

(B) Even if the receiving antenna 31-1 incurs radio wave interference at a given moment and undergoes the phenomenon of the electromagnetic wave energy becoming zero, either of the other receiving antennas 31-2 to 31-6 receives a different polarization plane and thus does not develop radio wave interference. This makes it possible to avoid the phenomenon of the electromagnetic wave energy becoming zero.

(C) The multiple receiving antennas 31-1 to 31-6 each receive an electromagnetic wave with a different polarization plane, the path difference phase shifters 32 correct the phase shifts Φ1 to Φn caused by the path differences between the electromagnetic waves received by the respective antennas, and the composer 33 composes the corrected signals. This makes it possible to improve reception sensitivity and boost the reliability of wireless communication.

(D) The rotating frequency f3 of the polarization plane of the electromagnetic wave is set to be higher than the frequency band f1 for transmitting the information signal. By further processing the composed received signals with the (1/f3) time resolution, the wireless receiver 30 can avert the phenomenon of the electromagnetic wave energy becoming zero and receive the information signal on the frequency band f1 without error.

(Structure of the Second Embodiment)

Figures 4A, 4B:
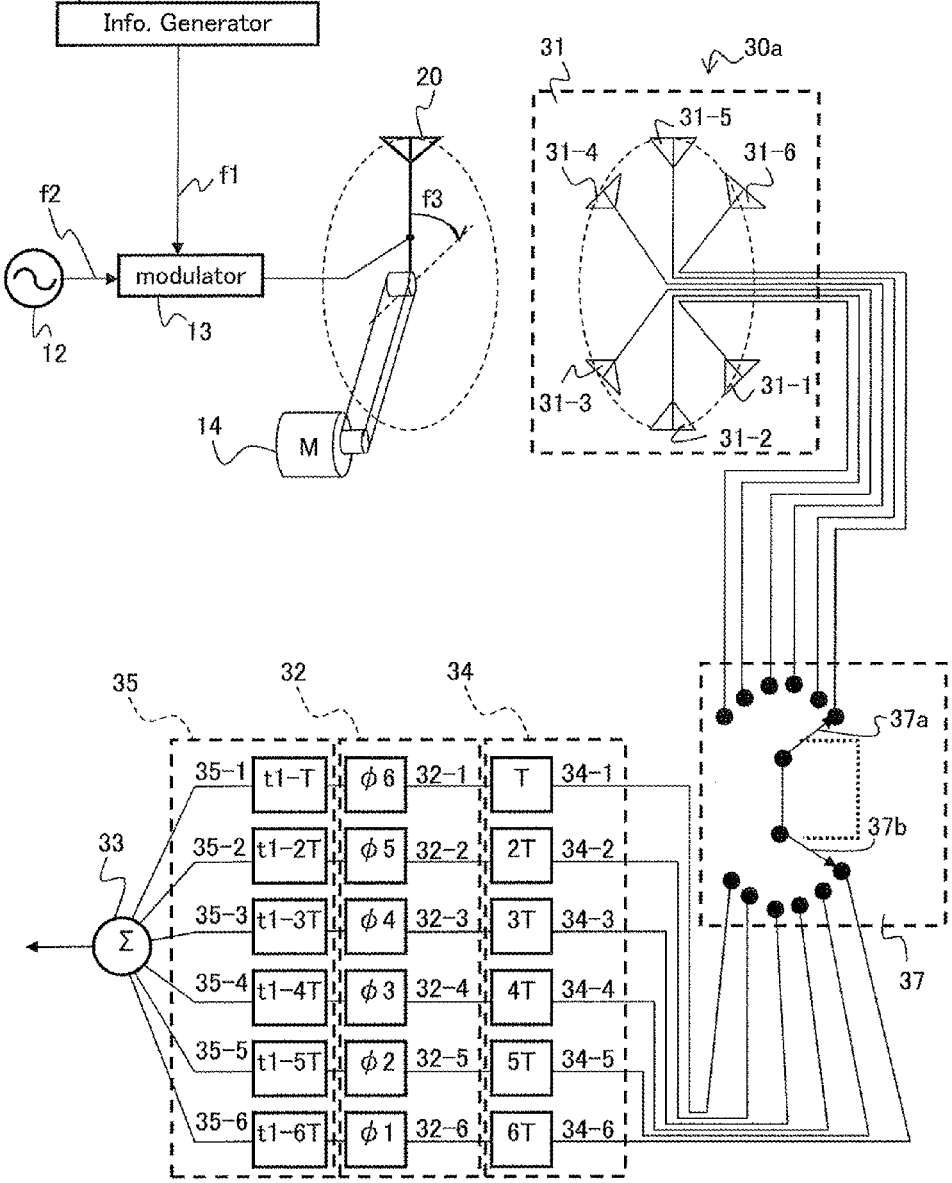
FIGS. 4A and 4B are general block diagrams of a wireless communication system according to a second embodiment.

FIGS. 4A and 4B are general block diagrams of a wireless communication system according to a second embodiment. The components in the drawings that are common to those in FIG. 1 showing the first embodiment are given the same reference numerals. FIG. 4A shows the structure of the wireless transmitter 10, and FIG. 4B indicates the structure of a wireless receiver 30a.

The wireless communication system of this embodiment includes the wireless transmitter 10 and wireless receiver 30a. The wireless transmitter 10 shown in FIG. 4A has substantially the same structure as the wireless transmitter 10 in FIG. 1A indicating the first embodiment and thus will not be explained further.

Like the wireless receiver 30 in FIG. 1B showing the first embodiment, the wireless receiver 30a in FIG. 4B(b) includes a diversity receiving antenna 31 including a plurality of receiving antennas 31-1 to 31-6, path difference phase shifters 32 (=32-1 to 32-6) as a plurality of signal correcting means, and a composer 33 as composing means. The wireless receiver 30a further includes delay devices 34 (=34-1 to 34-6), a time division switch 37, and delay devices 35 (=35-1 to 35-6). The time division switch 37 includes an input-side switch 37a and an output-side switch 37b, and the combination of their connections can be changed.

The receiving antennas 31-1 to 31-6 of this embodiment are connected respectively to the delay devices 34-1 to 34-6, path difference phase shifters 32-1 to 32-6, and delay devices 35-1 to 35-6 by way of the time division switch 37, and being all connected to the composer 33.

(Operation of the Second Embodiment)

By means of the time division switch 37, the wireless receiver 30a switches the connections between the receiving antennas 31-1 to 31-6 and the delay devices 34-1 to 34-6 rapidly in the (1/f3) cycle.

In this embodiment, as with the first embodiment, the frequency f1 as the first frequency is set to be lower than the carrier wave frequency f2 as the second frequency as well as the frequency f3 as the third frequency. The carrier wave frequency f2 is set to be higher than the frequency f3.

In a first period defined as ((1/f3)÷6), the wireless receiver 30a by means of the time division switch 37 connects the receiving antenna 31-1 with the delay device 34-1, the receiving antenna 31-2 with the delay device 34-2, and so on, and the receiving antenna 31-6 with the delay device 34-6.

In a second period of ((1/f3)÷6), the wireless receiver 30a by means of the time division switch 37 connects the receiving antenna 31-1 with the delay device 34-2, the receiving antenna 31-2 with the delay device 34-3, and so on, and the receiving antenna 31-6 with the delay device 34-1.

In a third period of ((1/f3)÷6), the wireless receiver 30a by means of the time division switch 37 connects the receiving antenna 31-1 with the delay device 34-3, the receiving antenna 31-2 with the delay device 34-4, and so on, and the receiving antenna 31-6 with the delay device 34-2.

In a fourth period of ((1/f3)÷6), the wireless receiver 30a by means of the time division switch 37 connects the receiving antenna 31-1 with the delay device 34-4, the receiving antenna 31-2 with the delay device 34-5, and so on, and the receiving antenna 31-6 with the delay device 34-3.

In a fifth period of ((1/f3)÷6), the wireless receiver 30a by means of the time division switch 37 connects the receiving antenna 31-1 with the delay device 34-5, the receiving antenna 31-2 with the delay device 34-6, and so on, and the receiving antenna 31-6 with the delay device 34-4.

In a sixth period of $((1/f3) \div 6)$, the wireless receiver 30a by means of the time division switch 37 connects the receiving antenna 31-1 with the delay device 34-6, the receiving antenna 31-2 with the delay device 34-1, and so on, and the receiving antenna 31-6 with the delay device 34-5.

The above switching is synchronized with the mechanical revolutions of the transmitting antenna 20. The switching keeps within a predetermined range the relative angle between the transmitting antenna 20 on the one hand and the receiving antennas 31-1 to 31-6 connected respectively to the delay devices 34-1 to 34-6 on the other hand.

The receiving receiver 30a further delays the input signals by delay amounts of T to 6T by means of the delay devices 34-1 to 34-6. Since the input electromagnetic wave has its polarization plane rotated in the (1/f3) cycle, the interference resulting from radio wave scattering occurs in the (1/f3) cycle. To suppress the interference caused by such radio wave scattering, the delay amount T is determined as $((1/f3) \div 6)$ that permits even sampling in the (1/f3) cycle.

The path difference phase shifters 32-1 to 32-6 correct the phase shifts $\Phi 1$ to $\Phi 6$ caused by electromagnetic wave path differences in the delayed signals. The electromagnetic wave path differences are generated by reflection of polarized waves, with the polarized electromagnetic waves rotated in the (1/f3) cycle, so that the phase shift due to the electromagnetic wave path differences also occurs in the (1/f3) cycle. However, even if the phase shifts are not corrected optimally at all moments, other delay signals can be used to suppress radio wave interference. Thus the correction values for the phase shifts $\Phi 1$ to $\Phi 6$ resulting from the electromagnetic wave path differences may each be set to a predetermined fixed value that ensures the least interference.

The delay devices 35-1 to 35-6 delay the input signals compensated for their rotational phases by amounts of (t1−T) to (t1−6T), respectively. A predetermined time t1 is a constant number that need only be 6T or higher. This makes it possible to have the delay amounts of all delayed signals converging on the predetermined time t1.

The composer 33 adds up all input signals. This makes it possible to avert the phenomenon of the electromagnetic wave energy becoming zero due to interference even if any one of the receiving antennas 31-1 to 31-6 incurs radio wave interference.

Furthermore, because the frequency band f1 of the information signal is lower than the frequency f3, the composed received signals need only attain a predetermined signal intensity somewhere during the (1/f3) cycle. Thus it is possible to avert communication error caused by radio wave interference.

As described, the wireless transmitter 10 and wireless receiver 30a of this invention can avoid communication error caused by radio wave interference even if the installation environment changes in a manner causing dynamic changes of the electromagnetic wave path from the wireless transmitter 10 up to the wireless receiver 30a. This makes it possible to improve reception sensitivity and boost the reliability of wireless communication.

(Advantageous Effects of the Second Embodiment)

The second embodiment explained above offers the following advantageous effects (E) and (F):

(E) The wireless transmitter 10 and wireless receiver 30a of this invention can avert communication error caused by radio wave interference even when the installation environment varies in a manner causing dynamic changes of the electromagnetic wave path from the wireless transmitter 10 up to the wireless receiver 30a. This makes it possible to improve reception sensitivity and boost the reliability of wireless communication.

(F) The cycle or half cycle of the rotating polarization plane of the electromagnetic wave received by the wireless receiver 30a is evenly sampled. Thus even if radio wave interference takes place at a given timing, the interference does not occur at another delay timing. This makes it possible to avert the phenomenon of the electromagnetic wave energy becoming zero due to interference.

<<Advantages of a Digitized Wireless Communication System>>

What has hindered communication equipment from offering long service life is the presence of analog nonlinear elements. The analog nonlinear elements are basic elements providing wireless communication equipment such as analog mixers, analog modulators, and analog frequency synthesizers. Because they handle analog signals, these analog nonlinear elements need to have their operating points (active regions) strictly fixed. Semiconductor devices, which make up the majority of analog nonlinear elements, have their operating points (active regions) varied depending on the change in ambient temperature as well as on secular change. These variations necessitate readjusting the operating points of the semiconductor devices, which has hampered communication equipment from getting long service life.

However, with digital elements getting significantly faster in speed in recent years, it is now possible to implement with digital circuits the functions such as mixing, modulation, and frequency conversion that were used to be performed with analog nonlinear elements. This has eliminated the need for readjusting the operating points of semiconductor devices and contributed to enabling wireless communication equipment to provide longer service life.

According to sampling theorem, implementing the function equivalent to that of an analog circuit using a digital circuit requires that the analog signal in use be digitized in a sampling cycle at least twice that of the frequency to be handled and that the digital circuit operate in that sampling cycle. The frequency pertaining to the sampling cycle is called Nyquist frequency. To perform digital signal processing in a stable manner requires that the analog signal in use be sampled in a sampling cycle at least four times the desired frequency and that the digital signal thus sampled be processed by the digital circuit.

Wireless communication equipment uses electromagnetic waves that propagate in the air that serves as a medium for communication transmission. The frequencies of the electromagnetic waves that can propagate in the air range from 300 MHz to 30 GHz. When the frequency of the electromagnetic wave is lower than 300 MHz, the efficiency in radiating radio waves into the air drops significantly. When the frequency of the electromagnetic wave is higher than 3 GHz, the electromagnetic wave energy attenuates so much due to the phenomenon of scattering caused by blocking, reflection, diffraction, etc., of the radio wave during propagation through the air that long-distance communication cannot be performed; only short-range communication is possible. Thus the frequencies to be handled by wireless communication equipment are limited to the range of 300 MHz to 3 GHz. At present, the operating frequencies of general-purpose digital devices are as high as hundreds of MHz to several GHz, which has made it possible to introduce digital circuits into wireless communication devices that need no adjustment while offering long service live.

Described below are examples in which analog signals are converted to and processed as digital signals by the third to the seventh embodiments of this invention.

(Structure of the Third Embodiment)

Figure 5A:
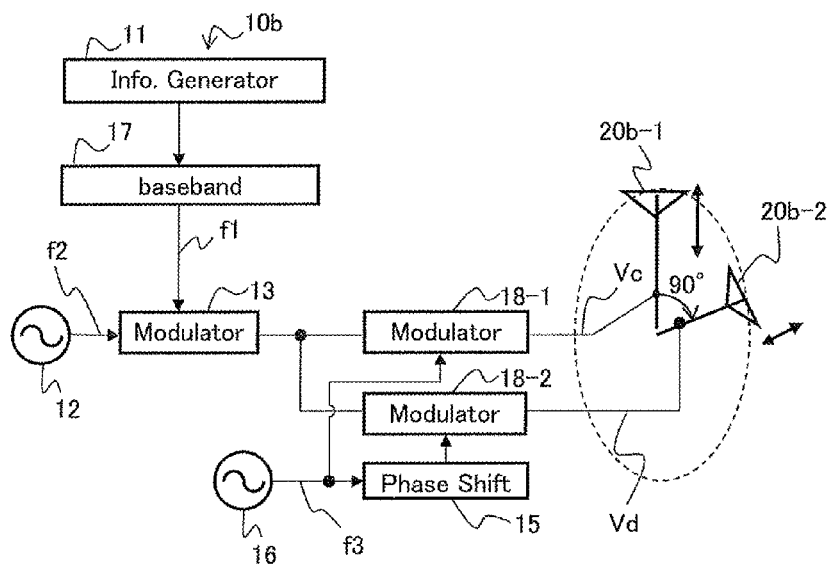
FIGS. 5A and 5B are general block diagrams of a wireless communication system according to a third embodiment.
Figure 5B:
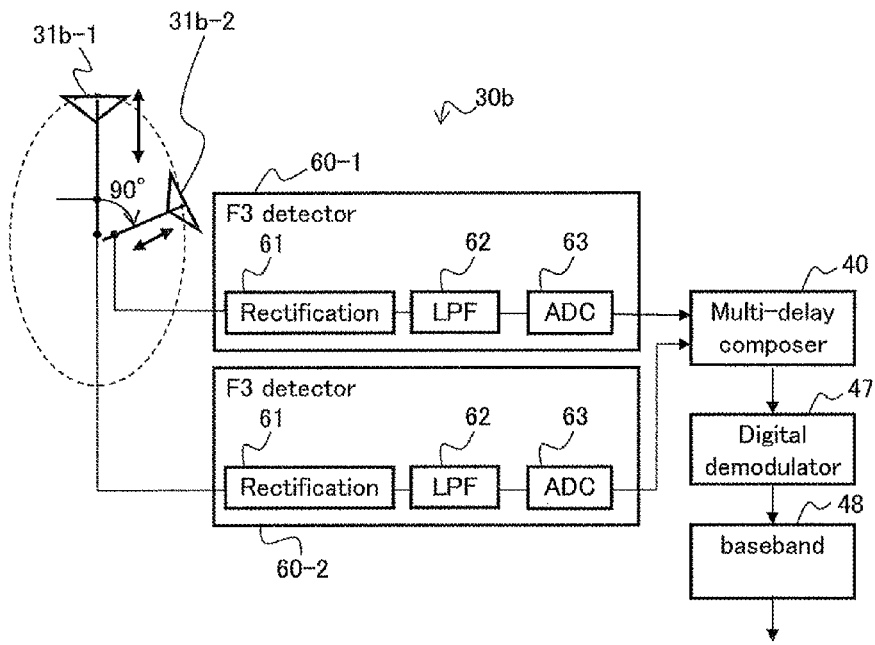

FIGS. 5A and 5B are schematic structure charts showing a wireless communication system as the third embodiment. The components in the drawings that are common to those in FIG. 1 showing the first embodiment are given the same reference numerals.

The wireless communication system of this embodiment has a wireless transmitter 10b and a wireless receiver 30b.

The wireless transmitter 10b shown in FIG. 5A includes the information generation circuit 11, the oscillator 12, and the modulator 13 similar to the wireless transmitter 10 of the first embodiment, and transmitting antennas 20b-1 and 20b-2 different from the components of the wireless transmitter 10 of the first embodiment. Also included are a baseband circuit 17, an oscillator 16, a phase shift circuit 15 as phase shifting means, a modulator 18-1 as second modulating means, and a modulator 18-2 as third modulating means.

The output side of the information generation circuit 11 is connected to the baseband circuit 17. The output side of the baseband circuit 17 and the output side of the oscillator 12 are connected to the modulator 13.

The output side of the modulator 13 is connected to the modulators 18-1 and 18-2. The modulator 18-1 is further connected with the output side of the oscillator 16. The modulator 18-2 is further connected with the output side of the oscillator 16 by way of the phase shift circuit 15.

The output side of the modulator 18-1 is connected to the transmitting antenna 20b-1 as a first transmitting antenna. The output side of the modulator 18-2 is connected to the transmitting antenna 20b-2 as a second transmitting antenna.

The baseband circuit 17 has the function of converting the signal output from the information generation circuit 11 into a digital signal.

The oscillator 16 has the function of outputting an oscillation signal having the frequency f3.

The modulators 18-1 and 18-2 have the function of further modulating the signal output from the modulator 13 by the frequency f3.

The phase shift circuit 15 has a function of shifting by 90 degrees the phase of the oscillation signal having the frequency f3. However, this angle need not be strictly 90 degrees, but the angle may be between 85 and 95 degrees. In this case, the noise component caused by angle shift in the oscillation signal is maximized up to COS(85 degrees) =COS(95 degrees)=8.7%. If the angle is less than 85 degrees or more than 95 degrees, the noise component caused by angle shift in the oscillation signal is maximized to 8.7% or higher.

The transmitting antennas 20b-1 and 20b-2 have the function of transmitting a linearly polarized wave, and are arranged to be at 90 degrees to each other. However, this angle need not be strictly 90 degrees, but the angle may be between 85 and 95 degrees. In this case, a maximum value of the noise component caused by angle shift in the linearly polarized wave is COS(85 degrees)=COS(95 degrees) =8.7%. If the angle is less than 85 degrees or more than 95 degrees, the noise component caused by angle shift in the oscillation signal is maximized to 8.7% or higher.

The wireless receiver 30b shown in FIG. 5B includes a receiving antenna 30b-1 as a first receiving antenna, a receiving antenna 31b-2 as a second receiving antenna, a rotational frequency detection circuit 60-1 as first rotational frequency detecting means, a rotational frequency detection circuit 60-2 as second rotational frequency detecting means, a multi-delay composition circuit 40 as multi-delay composing means, a digital demodulation circuit 47, and a baseband circuit 48. Furthermore, the rotational frequency detection circuits 60-1 and 60-2 each have a rectification circuit 61, a low-pass filter 62, and an analog/digital converter (called the A/D converter hereunder) 63.

The output sides of the receiving antennas 31b-1 and 31b-2 are connected to the rotational frequency detection circuits 60-1 and 60-2, respectively. The output sides of the rotational frequency detection circuits 60-1 and 60-2 are connected to the multi-delay composition circuit 40. The output side of the multi-delay composition circuit 40 is connected to the digital demodulation circuit 47. The output side of the digital demodulation circuit 47 is connected to the baseband circuit 48. The output terminal of the baseband circuit 48 serves as the output terminal of this wireless receiver 30b.

The receiving circuits 31b-1 and 31b-2 are arranged perpendicularly to each other and have the function of receiving a linearly polarized wave each. However, this angle need not be strictly 90 degrees; the angle may be between 85 and 95 degrees. In this case, a maximum value of the noise component caused by angle shift in the received signal is COS(85 degrees)=COS(95 degrees)=8.7%. If the angle is less than 85 degrees or more than 95 degrees, the noise component caused by angle shift in the oscillation signal is maximized to 8.7% or higher.

Suppose now the case where the amount of phase shift of the phase shift circuit 15, the installation angle between the transmitting antennas 20b-1 and 20b-2, and the installation angle between the receiving antennas 31b-1 and 31b-2 are all either 85 or 95 degrees. In this case, the noise components resulting from phase shift amount to 8.7%×3=26.1% in total. Thus the noise components in the oscillation signal generated during decoding due to the amount of phase shift of the phase shift circuit 15, the shift in the installation angle between the transmitting antennas 20b-1 and 20b-2, and the shift in the installation angle between the receiving antennas 31b-1 and 31b-2 is 26.1% or less.

The rotational frequency detection circuits 60-1 and 60-2 have the function of rectifying the input signal to detect a signal having a frequency lower than f3 and converting the detected signal from analog to digital form.

The input terminals to the rotational frequency detection circuits 60-1 and 60-2 are connected to the rectification circuit 61. The output side of the rectification circuit 61 is connected to the low-pass filter 62. The output side of the low-pass filter 62 is connected to the A/D converter 63. The output side of the A/D converter is connected to the output terminals of the rotational frequency detection circuits 60-1 and 60-2.

The multi-delay composition circuit 40 has the function of delaying the input signals by a predetermined amount to perform polarized wave phase rotation for correcting the phase shift θ of the polarization plane caused by reflection of the electromagnetic wave and carrying out path difference phase correction to correct the phase shift Φ caused by path difference in the electromagnetic wave, before compensating the delays of the predetermined amount for signal composition.

The digital demodulation circuit 47 has the function of demodulating the input digital signal into a baseband signal.

The baseband circuit 48 has the function of processing the input baseband signal.

In this embodiment, as with the first embodiment, the frequency f1 as the first frequency is set to be lower than the carrier wave frequency f2 as the second frequency and the frequency f3 as the third frequency. The carrier wave frequency f2 is set to be higher than the frequency f3.

(Operation of the Third Embodiment)

Figure 6A:
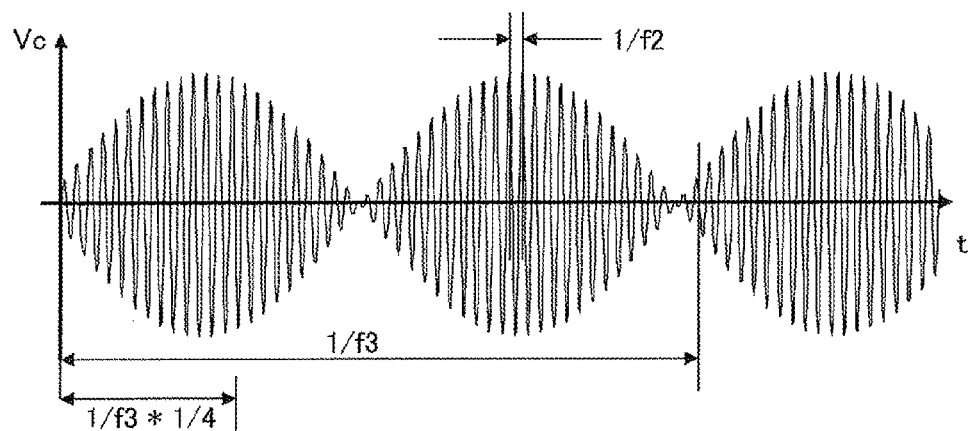
FIGS. 6A to 6C are illustrations showing operations of the wireless communication system according to the third embodiment.
Figure 6B:
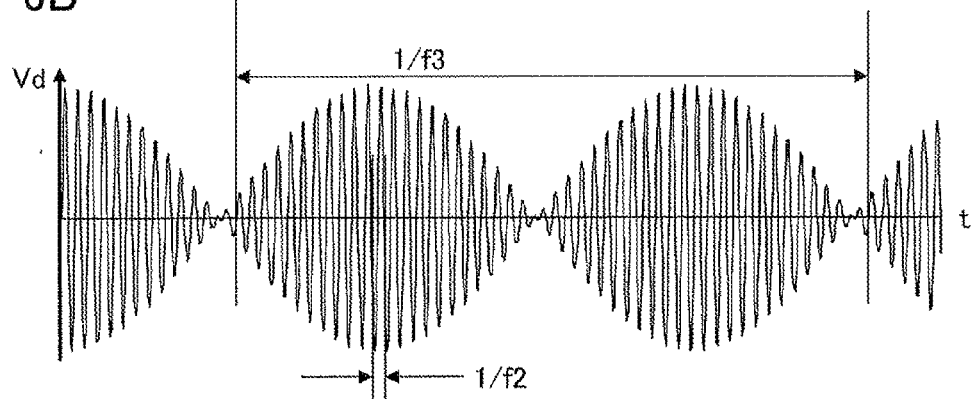
Figure 6C:
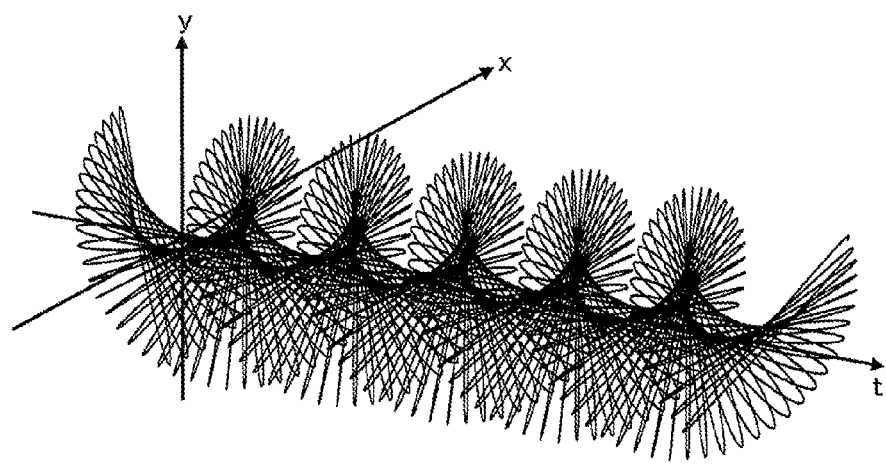

FIGS. 6A to 6C are illustrations showing operations of the wireless communication system according to the third embodiment.

In FIG. 6A, the horizontal axis represents time t and the vertical axis denotes a voltage Vc. The voltage Vc vibrates finely at the carrier wave f2, and the envelope of the waveform vibrates in undulating fashion at the frequency f3.

In FIG. 6B, the horizontal axis represents time t and the vertical axis denotes a voltage Vd. The voltage Vd vibrates finely at the carrier wave f2, and the envelope of the waveform vibrates in undulating fashion at the frequency f3 and 90 degrees out of phase with the voltage Vc.

FIG. 6C is a three-dimensional diagram showing a variation of an electromagnetic wave transmitted by antennas 20b-1 and 20b-2 and composed thereafter change over time on the x-y plane. As with the change of the electromagnetic wave over time shown in FIG. 3C, the polarization plane indicated by the waveform of the frequency f2 rotates on the x-y plane at the frequency f3, so that the changes of the envelope curve over time take on a spiral shape in an x-y-t space.

The wireless transmitter 10b causes the signal modulated by the carrier wave f2 to be further modulated using a signal having the frequency f3 higher than the frequency f2 to generate a first output signal, and has the first output signal transmitted from the transmitting antenna 20b-1. Also, the wireless transmitter 10b generates a second output signal by causing the signal modulated by the carrier wave f2 to be further modulated using a signal having the frequency f3 with its phase rotated by 90 degrees, and has the second output signal transmitted from the transmitting antenna 20b-2 set up at the angle of 90 degrees to the transmitting antenna 20b-1. Where they are installed, the transmitting antennas 20b-1 and 20b-2 do not interfere with each other because they transmit an electromagnetic wave having two polarized wave components that are orthogonal to and independent of each other. Thus the two transmitting antennas 20b-1 and 20b-2 may be integrally adhered together in a cross shape, which makes the entire transmitting antenna arrangement smaller in size.

The wireless receiver 30b receives the vertically polarized component of the electromagnetic wave by means of the vertically installed receiving antenna 31b-1, and the horizontally polarized component of the electromagnetic wave using the horizontally installed receiving antenna 31b-2. Where they are installed, the receiving antennas 31b-1 and 31b-2 do not interfere with each other because they receive the electromagnetic wave having two polarized wave components that are orthogonal to and independent of each other. The two receiving antennas 31b-1 and 31b-2 may thus be integrally put together in a cross shape, which makes the entire receiving antenna arrangement smaller in size.

According to this embodiment, the two polarized wave components orthogonal to each other are independent of each other. This allows each piece of information to be transmitted and received over two transmission paths that are in orthogonal relation to each other. This in turn makes it possible to improve reception sensitivity and boost the reliability of wireless communication.

According to this embodiment, two integrally formed receiving antennas 31b-1 and 31b-2 can receive the electromagnetic wave arriving at any polarization angle. This can reduce the number of antennas to be installed, which reduces the size of the equipment and lowers its cost.

According to this embodiment, there is no need to mechanically rotate the transmitting antennas 20b-1 and 20b-2. This eliminates the need for mounting the rotating means such as the motor 14 and contributes to making the equipment smaller in size and enhancing equipment reliability.

(Advantageous Effects of the Third Embodiment)

The third embodiment explained above offers the following advantageous effects (G) to (J):

(G) Where they are installed, the transmitting antennas 20b-1 and 20b-2 do not interfere with each other because they transmit the electromagnetic wave having two polarized wave components that are orthogonal to and independent of each other. Thus the two transmitting antennas 20b-1 and 20b-2 may be integrally put together in a cross shape, which makes the entire transmitting antenna arrangement smaller in size.

(H) Where they are installed, the receiving antennas 31b-1 and 31b-2 do not interfere with each other because they receive the electromagnetic wave having two polarized wave components that are orthogonal to and independent of each other. The two receiving antennas 31b-1 and 31b-2 may thus be integrally put together in a cross shape, which makes the entire receiving antenna arrangement smaller in size.

(I) The two integrally formed receiving antennas 31b-1 and 31b-2 can receive the electromagnetic wave arriving at any polarization angle. This can reduce the number of antennas to be installed, which reduces the size of the equipment and lowers its cost.

(J) There is no need to mechanically rotate the transmitting antennas 20b-1 and 20b-2. This eliminates the need for mounting the rotating means such as the motor 14 and contributes to making the equipment smaller in size and enhancing equipment reliability.

(Structure of the Fourth Embodiment)

Figure 7A:
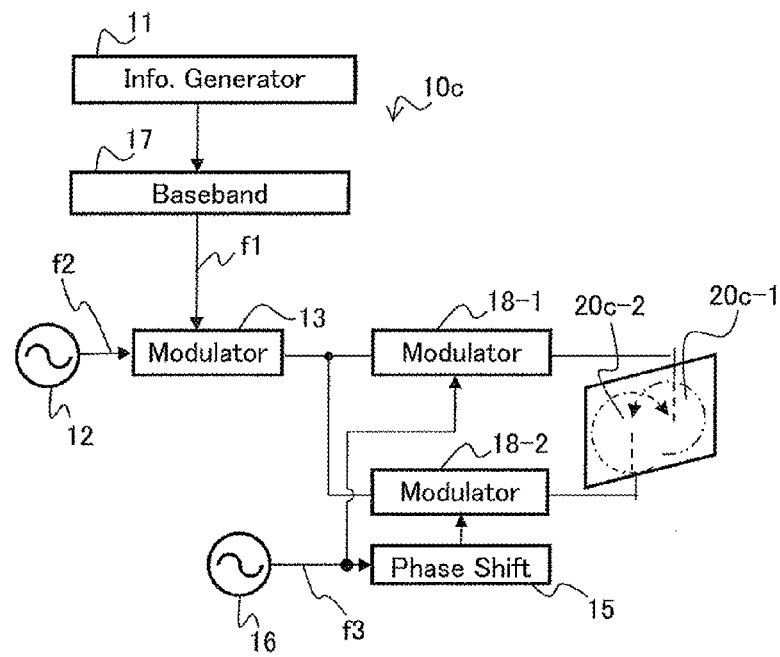
FIGS. 7A and 7B are general block diagrams of a wireless communication system according to a fourth embodiment.
Figure 7B:
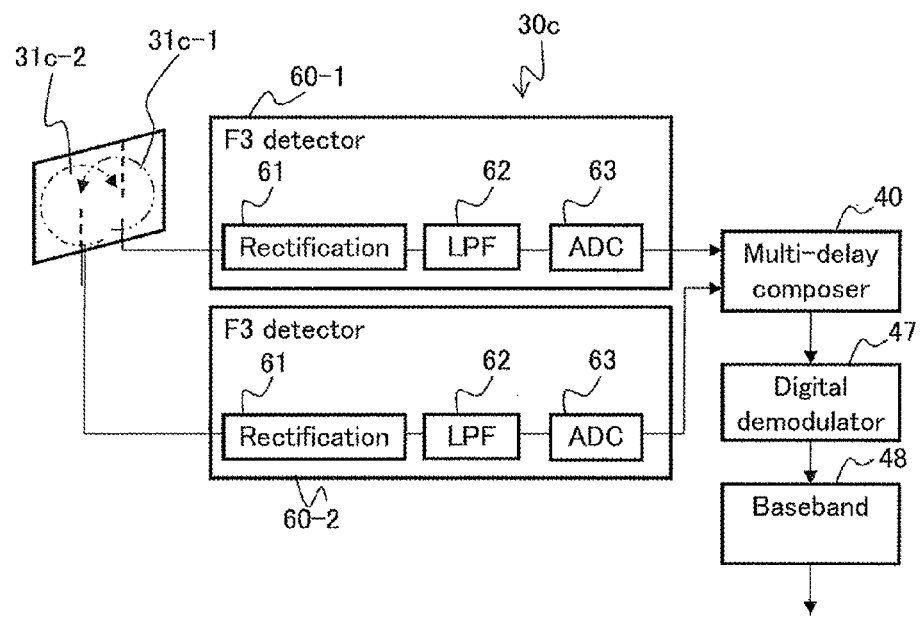

FIGS. 7A and 7B are general block diagrams of a wireless communication system according to a fourth embodiment. The components in the drawings that are common to those in FIG. 5 showing the third embodiment are given the same reference numerals.

A wireless transmitter 10c shown in FIG. 7A includes an information generation circuit 11, an oscillator 12, a modulator 13, a baseband circuit 17, and modulators 18-1 and 18-2 which are similar to their counterparts in the wireless transmitter 10b of the third embodiment shown in FIG. 5A. Also included in the wireless transmitter 10c are transmitting antennas 20c-1 and 20c-2 different from the components of the wireless transmitter 10b of the third embodiment.

The transmitting antennas 20c-1 and 20c-2 each have the function of transmitting a circularly polarized electromagnetic wave, and are positioned to transmit the waves circularly polarized in mutually opposite directions. With this embodiment, the transmitting antenna 20c-1 as a first transmitting antenna has the function of transmitting a right-handed circularly polarized wave. The transmitting antenna 20c-2 as a second transmitting antenna has the function of transmitting a left-handed circularly polarized wave.

The transmitting antennas 20c-1 and 20c-2 transmit circularly polarized waves of which the rotating directions are opposite to each other. The transmitting antennas 20c-1 and 20c-transmit electromagnetic waves having two independent polarized wave components only by being stuck together in such a manner that the rotating directions of the two wave components are in mutually opposite directions.

That is, compared with the transmitting antennas 20b-1 and 20b-2 of the third embodiment, the transmitting antennas of this embodiment have the advantage of minimizing the possibility of the polarized wave components mixing with each other when the antennas are not positioned strictly perpendicular to each other. The transmitting antennas of this embodiment are also advantageous in that they are easy to manufacture and need no adjustment after fabrication.

A wireless receiver 30c shown in FIG. 7B includes rotational frequency detection circuits 60-1 and 60-2, a multi-delay composition circuit 40, a digital demodulation circuit 47, and a baseband circuit 48 which are similar to the wireless receiver 30b of the third embodiment shown in FIG. 5B. Also included in the wireless receiver 30c are receiving antennas 31c-1 and 31-c different from the components of the wireless transmitter 10b of the third embodiment shown in FIG. 5B.

The receiving antenna 31c-1 as a first receiving antenna and the receiving antenna 31c-2 as a second receiving antenna have the function of receiving a circularly polarized electromagnetic wave each, and are positioned to receive circularly polarized waves in mutually opposite directions. In this embodiment, the receiving antenna 31c-1 has the function of receiving a right-handed circularly polarized wave. The receiving antenna 31c-2 has the function of receiving a left-handed circularly polarized wave.

The receiving antennas 31c-1 and 31c-2 likewise transmit the electromagnetic wave having two independent polarized wave components only by being stuck together in such a manner that the rotating directions of the two wave components are in mutually opposite directions. That is, the receiving antennas of this embodiment have the advantage of minimizing the possibility of the polarized wave components mixing with each other when the antennas are not positioned strictly perpendicular to each other. Compared with the receiving antennas 31b-1 and 31b-2 of the third embodiment, the receiving antennas of this embodiment are also advantageous in that they are easy to manufacture and need no adjustment after fabrication.

In this embodiment, as with the first embodiment, the frequency f1 as the first frequency is lower than the carrier wave frequency f2 as the second frequency and the frequency f3 as the third frequency. The carrier wave frequency f2 is higher than the frequency f3.

(Operation of the Fourth Embodiment)

The wireless transmitter 10c of the fourth embodiment operates in the same manner as the wireless transmitter 10b of the third embodiment, except that the wireless transmitter 10c transmits the electromagnetic wave composed of the right-handed and left-handed circularly polarized waves different from the vertically and horizontally polarized waves transmitted by the wireless transmitter 10b of the third embodiment.

The wireless receiver 30c of the fourth embodiment operates in the same manner as the wireless receiver 30b of the third embodiment, except that the wireless receiver 30c receives the electromagnetic wave composed of the right-handed and left-handed circularly polarized waves different from the vertically and horizontally polarized waves received by the wireless receiver 30b of the third embodiment.

(Advantageous Effects of the Fourth Embodiment)

The fourth embodiment explained above offers the following advantageous effects (K) and (L):

(K) The transmitting antennas 20c-1 and 20c-2 transmit the electromagnetic wave having two independent polarized wave components only by being stuck in such a manner that the rotating directions of the two wave components are in mutually opposite directions. Thus these transmitting antennas are easy to manufacture and need no adjustment after fabrication.

(L) The receiving antennas 31c-1 and 31c-2 likewise transmit the electromagnetic wave having two independent polarized wave components only by being stuck together in such a manner that the rotating directions of the two wave components are in mutually opposite directions. Thus these receiving antennas are easy to manufacture and need no adjustment after fabrication.

(Structure of the Fifth Embodiment)

Figure 8A:
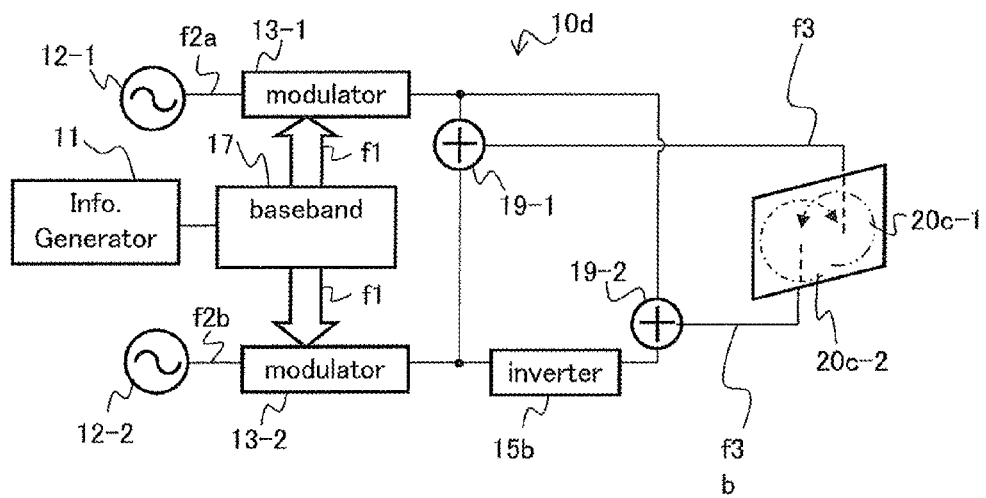
FIGS. 8A and 8B are general block diagrams of a wireless communication system according to a fifth embodiment.
Figure 8B:
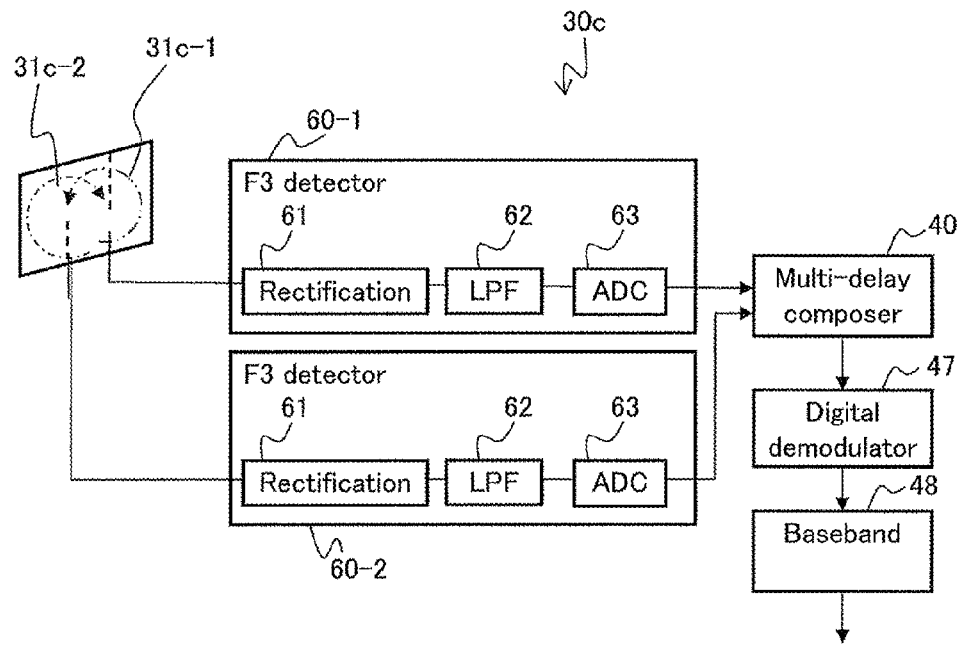

FIGS. 8A and 8B are schematic structure charts showing a wireless communication system as the fifth embodiment. The components in the drawings that are common to those in FIG. 7 showing the fourth embodiment are given the same reference numerals.

A wireless transmitter 10d shown in FIG. 8A includes an information generation circuit 11, a baseband circuit 17, a transmitting antenna 20c-1 as a first transmitting antenna, and a transmitting antenna 20c-2 as a second transmitting antenna, which are the components being similar to the wireless transmitter 10c of the fourth embodiment. Also included in the wireless transmitter 10d are oscillators 12-1 and 12-2, a modulator 13-1 as first modulating means, a modulator 13-2 as fourth modulating means, a phase inversion circuit 15b, an adder 19-1 as first composing means, and an adder 19-2 as second composing means, which are different from those of the wireless transmitter 10c of the fourth embodiment.

The output side of the information generation circuit 11 is connected to the baseband circuit 17. The output side of the baseband circuit 17 and that of the oscillator 12-1 are connected to the modulator 13-1. The output side of the baseband circuit 17 and that of the oscillator 12-2 are connected to the modulator 13-2.

The output side of the modulator 13-1 and that of the modulator 13-2 are connected to the adder 19-1. The output side of the adder 19-1 is connected to the transmitting antenna 20c-1.

Furthermore, the output side of the modulator 13-2 is connected to the phase inversion circuit 15b. The output side of the phase inversion circuit 15b and an output of the modulator 13-1 are connected to the adder 19-2. The output side of the adder 19-2 is connected to the transmitting antenna 20c-2.

The wireless receiver 30c shown in FIG. 8B has substantially the same structure as the wireless receiver 30c of the fourth embodiment.

With this embodiment, the frequency f1 as the first frequency is lower than a carrier wave frequency f2a as the second frequency, a carrier wave frequency f2b as a fourth frequency, and the frequency f3 as the third frequency. The carrier wave frequencies f2a and f2b are higher than the frequency f3.

(Operation of the Fifth Embodiment)

The oscillator 12-1 has the function of outputting to the modulator 13-1 the carrier wave frequency f2a as the second frequency.

The oscillator 12-2 has the function of outputting to the modulator 13-2 the carrier wave frequency f2b as the fourth frequency slightly different from the carrier wave frequency f2a. In this embodiment, the difference between the frequencies f2a and f2b is between 80 and 125 percent of the frequency f2a. If the difference between the frequencies f2a and f2b is less than 80 percent or more than 125 percent of the frequency f2, the frequencies of the envelopes of composed waves f3 and f3b, to be discussed later, will approach the frequencies f2a and f2b, which will make it difficult to extract the envelopes of the composed waves f3 and f3b.

The modulator 13-1 has the function of modulating the information signal of the frequency band f1 by the carrier wave frequency f2a as the second frequency and outputting the modulated signal as a first modulated signal.

The modulator 13-2 has the function of modulating the information signal of the frequency band f1 by the carrier wave frequency f2b as the fourth frequency and outputting the modulated signal as a fourth modulated signal.

The phase inversion circuit 15b has the function of inverting the first modulated signal and outputting the inverted signal.

The adder 19-1 has the function of adding up the inverted first modulated signal and the fourth modulated signal and outputting the resulting signal to the transmitting antenna 20c-1.

The adder 19-2 has the function of adding up the first modulated signal and the fourth modulated signal and outputting the resulting signal to the transmitting antenna 20c-2.

Figure 9A:
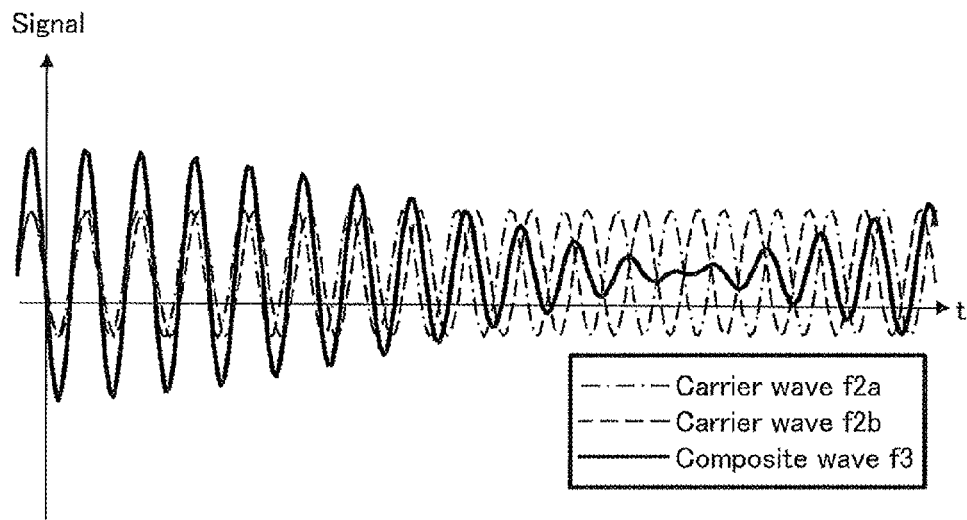
FIGS. 9A and 9B are illustrations showing an operation of the wireless communication system according to the fifth embodiment operates.
Figure 9B:
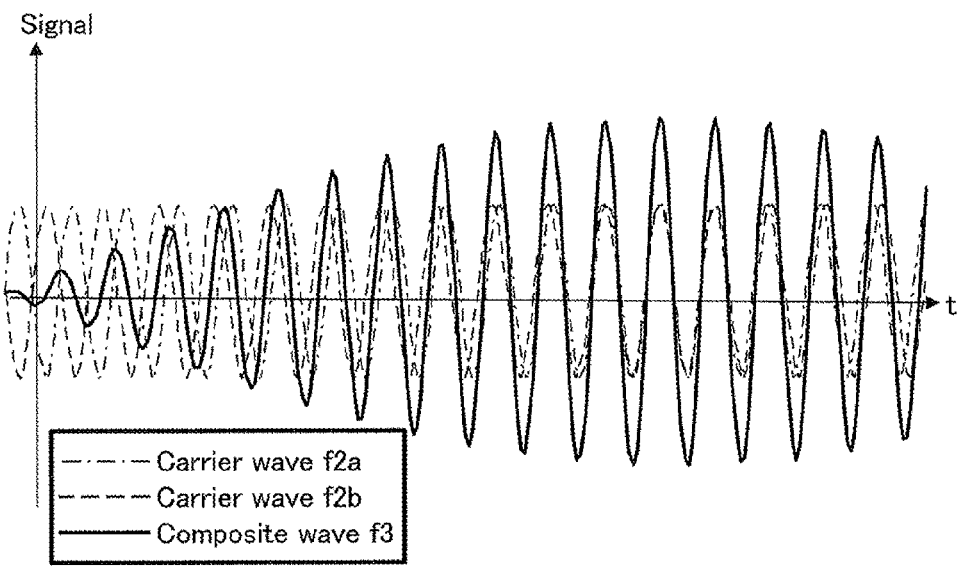

FIGS. 9A and 9B are illustrations showing an operation of the wireless communication system according to the fifth embodiment operates.

In FIG. 9A, the horizontal axis denotes time t and the vertical axis represents signal voltages. An alternate long and short dash line indicates the waveform of the carrier wave f2a; a chain line stands for the waveform of the carrier wave f2b, and a thick line denotes the composed wave f3 resulting from the two carrier waves composed by the adder 19-2. The slight difference between the carrier waves f2a and f2b causes the composed wave f3 to finely vibrate at a carrier wave frequency of (f2a+f2b)÷2, with the envelope of the composed wave f3 vibrating in undulating fashion at the frequency f3. Since there exists only the slight difference between f2a and f2b, the frequency of the carrier wave included in the composed wave is assumed to be f2a in the ensuing description.

In FIG. 9B, the horizontal axis denotes time t and the vertical axis represents signal voltages. An alternate long and short dash line indicates the waveform of the carrier wave f2a, a chain line stands for the waveform of the inverted carrier wave (−f2b), and a thick line denotes the composed wave f3b resulting from the two carrier waves composed by the adder 19-2. The slight difference between the carrier wave f2a and the carrier wave (−f2b) causes the composed wave f3b to finely vibrate at the carrier wave f2, with the envelope of the composed wave f3b vibrating in undulating fashion at the frequency f3. The envelope of the composed wave f3b is 90 degrees out of phase with the envelope of the composed wave f3.

With the wireless transmitter 10d of this embodiment, the output signals from two oscillators whose frequencies are slightly different from each other are each modulated as a carrier wave. The two modulated signals are added up to generate the frequency f3. The temporal waveform of the signal resulting from the addition has its envelope changed in accordance with a frequency |f2a−f2b|, an absolute value difference between the carrier waves f2a and f2b. In place of the phase shift circuit 15 of the fourth embodiment that rotates phase by 90 degrees, there is provided the phase inversion circuit 15b that rotates phase 180 degrees by inverting the signal. This eliminates the need for adjusting the amount of phase rotation with the phase shift circuit 15, which in turn contributes to eliminating the need for adjusting the wireless transmitter 10d.

(Advantageous Effects of the Fifth Embodiment)

The fifth embodiment explained above offers the following advantageous effect (M):

(M) In place of the phase shift circuit 15 that rotates phase by 90 degrees, there is provided the phase inversion circuit 15b that rotates phase 180 degrees by inverting the signal. This eliminates the need for adjusting the amount of phase rotation with the phase shift circuit 15, which in turn contributes to eliminating the need for adjusting the wireless transmitter 10d.

(Concept of the Sixth Embodiment)

Figure 10:
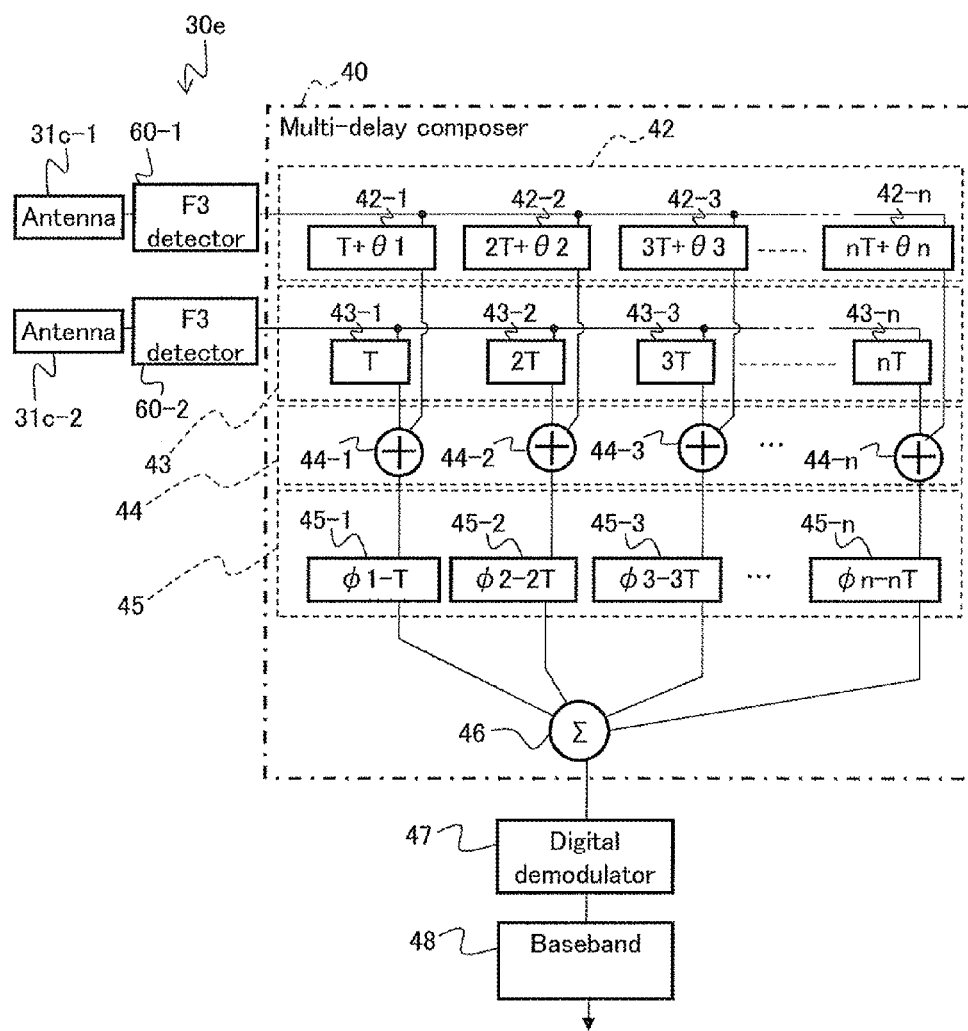
FIG. 10 is an illustration showing the concept of a multi-delay composition circuit according to a sixth embodiment.

FIG. 10 is an illustration showing the concept of a multi-delay composition circuit as the sixth embodiment.

The multi-delay composition circuit 40 is connected with the output sides of receiving antennas 31c-1 and 31c-2 by way of rotational frequency detection circuits 60-1 and 60-2. The output side of the multi-delay composition circuit 40 is connected to a digital demodulation circuit 47. The output side of the digital demodulation circuit 47 is connected to a baseband circuit 48. The output side of the baseband circuit 48 serves as the output of this wireless receiver 30e.

When receiving the frequency f3 component of the electromagnetic wave received by the receiving antennas 31c-1 and 31c-2, the multi-delay composition circuit 40 generates as many as n signals having delay amounts T to nT, corrects phase shifts θi of the electromagnetic wave polarization planes in these delayed signals, and corrects phase shifts Φi in the signals caused by electromagnetic wave path differences so as to compensate the signals for their delays before composing theses signals to increase a signal power.

The multi-delay composition circuit 40 includes a plurality of reflection phase shift delay devices 42 (=42-1 to 42-n), a plurality of delay devices 43 (=43-1 to 43-n), a plurality of adders 44 (=44-1 to 44-n), a plurality of path difference phase shift delay devices 45 (=45-1 to 45-n), and a composer 46.

The reflection phase shift delay device 42-i (i is a natural number from 1 to n) has the function of delaying the input signal by (i×T) and correcting the phase shift θi of the polarization plane caused by reflection of the electromagnetic wave.

The delay devices 43-i have a function of delaying the input signal by (i×T) each. The adders 44-i have the function of adding up the output signals from the reflection phase shift delay device 42-i and delay device 43-i so as to delay by the delay times T to 6T the multiple waves received by the receiving antennas 31c-1 and 31c-2, before outputting the delayed polarized wave signals.

The adders 44-i have the function of adding up the output signals from the reflection phase shift delay devices 42-i and the output signals from the delay devices 43-i.

Because the polarization plane of the electromagnetic wave rotates in the (1/f3) cycle, the interference caused by scattering of the radio wave occurs in the (1/f3) cycle. To suppress the interference caused by radio wave scattering, the delay amount T is set to be ((1/f3)÷n), a value that permits even sampling throughout the (1/f3) cycle. Thus even if radio wave interference takes place at any timing of the delay times T to 6T, it is possible to avert the phenomenon of the electromagnetic wave energy becoming zero due to interference. Furthermore, the delay amount is not limited to the above value; it may be set to a desired value, such as an integer multiple, a half, or 3/2 of the ((1/f3)÷n) cycle.

The path difference phase shift delay devices 45-i correct the phase shifts Φi due to electromagnetic wave path differences and make even the delays of the input signals to the reflection phase shift delay devices 42-*i* and delay devices 43-*i*. The composer 46 composes these signals to increase the signal power.

The output side of the rotational frequency detection circuit 60-1 is connected to the reflection phase shift delay devices 42-1 to 42-*n*. The output side of the rotational frequency detection circuit 60-2 is connected to the delay devices 43-1 to 43-*n*. The output side of the reflection phase shift delay device 42-1 and that of the delay device 43-1 are connected to the adder 44-1. The output side of the adder 44-1 is connected to the path difference phase shift delay device 45-1. These connections allow the phase shift caused by the electromagnetic wave path differences to be corrected before the signals are output to the composer 46.

The output sides of the reflection phase shift delay devices 42-*i* and those of the delay devices 43-*i* are connected to the adders 44-*i*. The output sides of the adders 44-*i* are connected to the path difference phase shift delay devices 45-*i*. The path difference phase shift delay devices 45-*i* correct the phase shifts of the i-th delayed signals caused by the electromagnetic wave path differences, before inputting the delayed signals to the composer 46. The composer 46 composes all of the first to the n-th delayed signals in order to increase the signal power of the output signal.

The output side of the composer 46 is the output side of this multi-delay composition circuit 40 and connected to the digital demodulation circuit 47. The output side of the digital demodulation circuit 47 is connected to the baseband circuit 48. By increasing signal power through correction, the multi-delay composition circuit 40 can minimize the error rate after demodulation by the digital demodulation circuit 47.

(Structure of the Sixth Embodiment)

Figure 11:
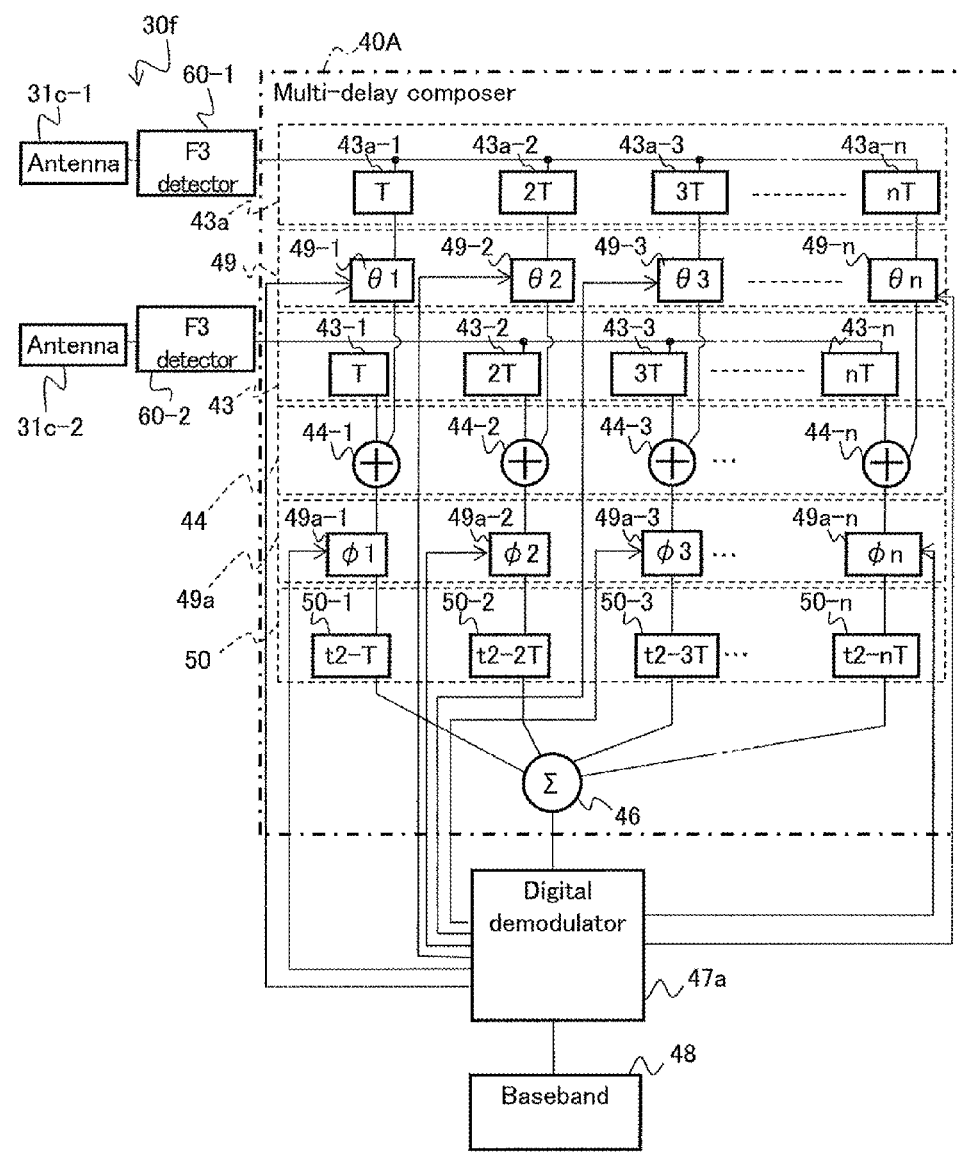
FIG. 11 is a general block diagram of the multi-delay composition circuit according to the sixth embodiment.

FIG. 11 is a general block diagram of the multi-delay composition circuit according to the sixth embodiment.

The output sides of the receiving antennas 31*c*-1 and 31*c*-2 are connected to the multi-delay composition circuit 40*a* by way of the rotational frequency detection circuits 60-1 and 60-2, as in the case of the multi-delay composition circuit 40 in FIG. 10. The output side of the multi-delay composition circuit 40 is connected to the digital demodulation circuit 47. The output side of the digital demodulation circuit 47 is connected to the baseband circuit 48. Control signals from the digital demodulation circuit 47 are further connected to the multi-delay composition circuit 40*a*. This control signal can control the correction of the phase shifts θ1 to θn of the polarization plane caused by reflection of the electromagnetic wave and the correction of the phase shifts Φ1 to Φ6 due to electromagnetic wave path differences.

The multi-delay composition circuit 40*a*, like the multi-delay composition circuit 40 in FIG. 10, includes a plurality of delay devices 43 (=43-1 to 43-*n*), a plurality of adders 44 (=44-1 to 44-*n*), and a composer 46. Also included are delay devices 43*a* (=43*a*-1 to 43*a*-*n*) and reflection phase shifters 49 (=49-1 to 49-*n*) in place of the multiple reflection phase shift delay devices 42 (=42-1 to 42-*n*), as well as path difference phase shifters 49*a* (=49*a*-1 to 49*a*-*n*) and delay devices 50 (=50-1 to 50-*n*) in place of the multiple path difference phase shift delay devices 45 (=45-1 to 45-*n*).

The delay devices 43*a* (=43*a*-1 to 43*a*-*n*) have the function of delaying the input signal by (i×T) each. The reflection phase shifters 49 (=49-1 to 49-*n*) have the function of correcting the phase shifts θ1 to θn of the polarization plane caused by reflection of the electromagnetic wave.

The delay devices 43-*i* have the function of delaying the input signals by (i×T) each. The adders 44-*i* have the function of adding up the output signals from the reflection phase shifters 49-*i* and the output signals from the delay devices 43-*i* so as to delay by the delay times T to 6T the multiple waves received by the receiving antennas 31*c*-1 to 31*c*-2, before outputting the delayed polarized wave signals.

The path difference phase shifters 49*a*-*i* have the function of correcting the phase shifts Φ1 to Φ6 caused by electromagnetic wave path differences. The delay devices 50-*i* have the function of delaying the signals by a delay time of (t2−i×T) each. As a result of this, all signals output from the delay devices 50-1 to 50-*n* are each delayed by a predetermined time t2. The composer 46 combines these signals to increase the signal power.

The output side of the composer 46 is the output side of this multi-delay composition circuit 40 and connected to the digital demodulation circuit 47*a*. The output side of the digital demodulation circuit 47*a* is connected to the baseband circuit 48. The digital demodulation circuit 47*a* further has the function of controlling the correction of the phase shifts θ1 to θn of the polarization plane caused by reflection of the electromagnetic wave and the correction of the phase shifts θΦ1 to Φn due to electromagnetic wave path differences. With this embodiment, the phase shifts Φ1 to Φn caused by electromagnetic wave path differences represent the phase shifts in effect at the frequency f3.

(Operation of the Sixth Embodiment)

The electromagnetic wave arriving at the receiving antennas 31*c*-1 and 31*c*-2 is converted by the rotational frequency detection circuits 60-1 and 60-2 into two digital signals having the (1/f3) cycle each.

One of the digital signals is input to the delay devices 43*a*-1 to 43*a*-*n* and the other digital signal to the delay devices 43-1 to 43-*n* so that the signals may each be delayed by a predetermined delay amount.

Furthermore, the output signals from the delay devices 43*a*-1 to 43*a*-*n* are corrected by the reflection phase shifters 49-1 to 49-*n* respectively for the phase shifts θi of the polarization plane caused by reflection of the electromagnetic wave. For example, the reflection phase shifters 49-1 to 49-*n* may delay the input signals by a predetermined time of ((θi÷2π)÷f3) each to correct the phase shifts θi of the polarization plane.

The corrected signals output from the reflection phase shifters 49-1 to 49-*n* and the output signals from the delay devices 43-1 to 43-*n* are added up by the adders 44-1 to 44-*n*, respectively. The output signals from the adders 44-1 to 44-*n* correspond to delay times T to nT, respectively, and constitute the received signals corrected for their phase shifts θ1 to θn of the polarization plane caused by reflection of the electromagnetic wave.

The output signals from the adders 44-1 to 44-*n* are corrected respectively by the path difference phase shifters 49*a*-1 to 49*a*-*n* for their phase shifts caused by the electromagnetic wave path differences, delay devices 50-1 to 50-*n* each cause the signals to have a predetermined time t2. The output signals from the delay devices 50-1 to 50-*n* are combined by the composer 46 so as to increase the signal power of the output signal.

The electromagnetic wave arriving at the receiving antennas 31*c*-1 and 31*c*-2 may incur interference due to radio wave scattering in the (1/f3) cycle, because the polarization plane rotates in the (1/f3) cycle. In order to suppress the interference caused by radio wave scattering, the delay devices 43-1 to 43-*n* and the delay devices 43*a*-1 to 43*a*-*n* sample evenly the (1/f3) cycle for signal processing. Thus the unit T of the delay amount of the delay devices 43*a*-1 to 43*a*-*n* is set to be either the value obtained by dividing the (1/f3) cycle by n or the value acquired by dividing ½ of the (1/f3) cycle by n. As a result of this, even if there occurs the phenomenon of the electromagnetic wave energy becoming zero due to interference on a particular polarization plane at a particular timing in the (1/f3) cycle, interference is not incurred on the other polarization planes at other delay times. This is expected to keep the electromagnetic wave energy from becoming zero.

The delay amount T is not limited to the above value; it may be set to a desired value, such as an integer multiple, a half, or ⅔ of the ((1/f3)÷n) cycle.

Figure 12:
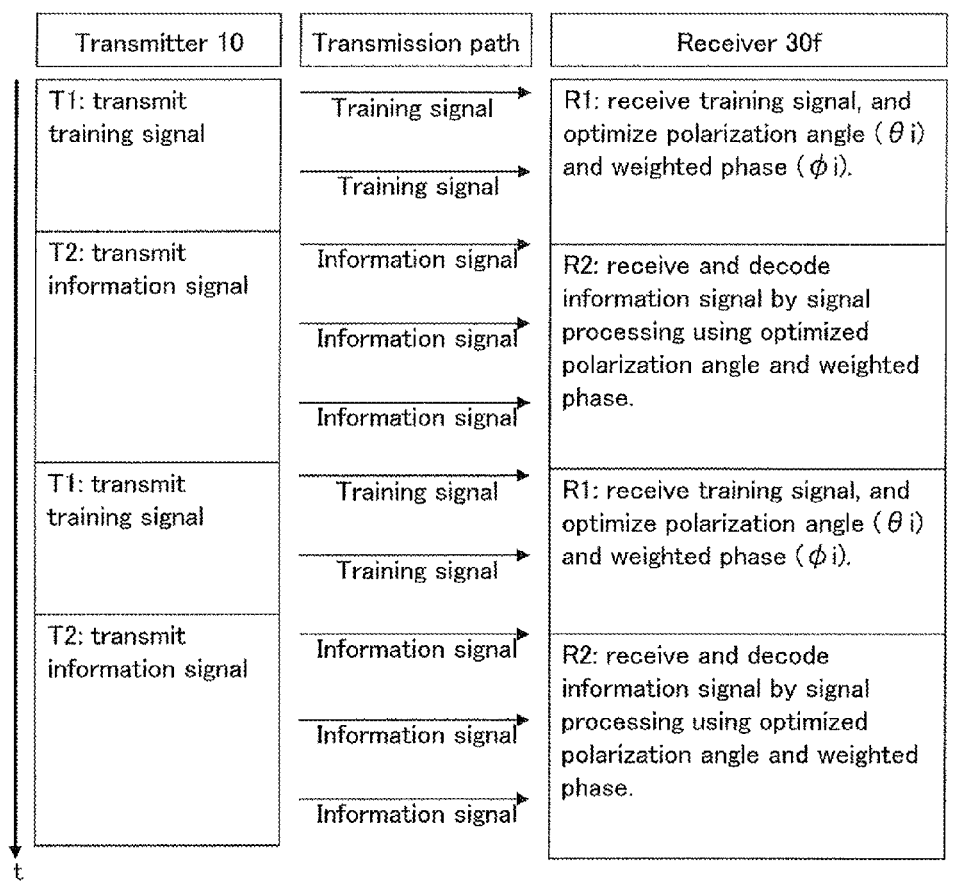
FIG. 12 is a chart showing an operation of a wireless communication system according to the sixth embodiment operates.

FIG. 12 is a chart showing an operation of a wireless communication system according to the sixth embodiment operates. Described along the horizontal axis are the operations of the wireless transmitter 10, a transmission path, and the operations of a wireless receiver 30f. The elapse of time t is indicated along the vertical axis.

At a timing T1 as the training period, the wireless transmitter 10 transmits a training signal. This training signal is transmitted over the transmission path. At a timing R1, the digital demodulation circuit 47a of the wireless receiver 30f receives the training signal, and optimizes the correction of the phase shifts θ1 to θn of the polarization plane caused by reflection of the electromagnetic wave and the correction of the phase shifts Φ1 to Φn due to electromagnetic wave path differences in such a manner as to maximize the intensity of the composed received signals.

At a timing T2, the wireless transmitter 10 transmits an information signal. This information signal is transmitted over the transmission path. At a timing R2, the wireless receiver 30f receives the information signal and decodes the received signal by correcting through optimization the phase shifts θ1 to θn of the polarization plane caused by reflection of the electromagnetic wave and the phase shifts Φ1 to Φn due to electromagnetic wave path differences. The optimization refers to changing the correction amounts of the phase shifts θ1 to θn of the polarization plane caused by reflection of the electromagnetic wave and adjusting the correction amounts of the phase shifts Φ1 to Φn due to electromagnetic wave path differences at delay times T to NT, for example.

The adjustment above can be accomplished, for example, by acquiring an optimum value of the phase shift Φ1 stemming from path differences through changes within a predetermined range, and then obtaining an optimum value of the phase shift θ1 of the polarization plane through changes within a predetermined range. This is repeated by the optimum values being applied repeatedly to the values of the phase shifts from θ1 onward of the polarization plane and to the values of the phase shifts from Φ1 onward stemming from path differences.

By repeating the processes at the timings T1 to T2 and R1 to R2 thereafter, the wireless transmitter 10 and wireless receiver 30f can further avert communication error due to radio wave interference even if the path of the electromagnetic wave from the wireless transmitter 10 to the wireless receiver 30f varies dynamically in a changing installation environment.

(Advantageous Effects of the Sixth Embodiment)

The sixth embodiment explained above offers the following advantageous effect (N):

(N) In the training period, the correction amounts of the phase shifts θ1 to θn of the polarization plane caused by reflection of the electromagnetic wave and the correction amounts of the phase shifts Φ1 to Φn due to electromagnetic wave path differences are optimized. This makes it possible to further avert communication error due to radio wave interference even if the path of the electromagnetic wave from the wireless transmitter 10 to the wireless receiver 30f varies dynamically in a changing installation environment.

(Structure of the Seventh Embodiment)

Figure 13:
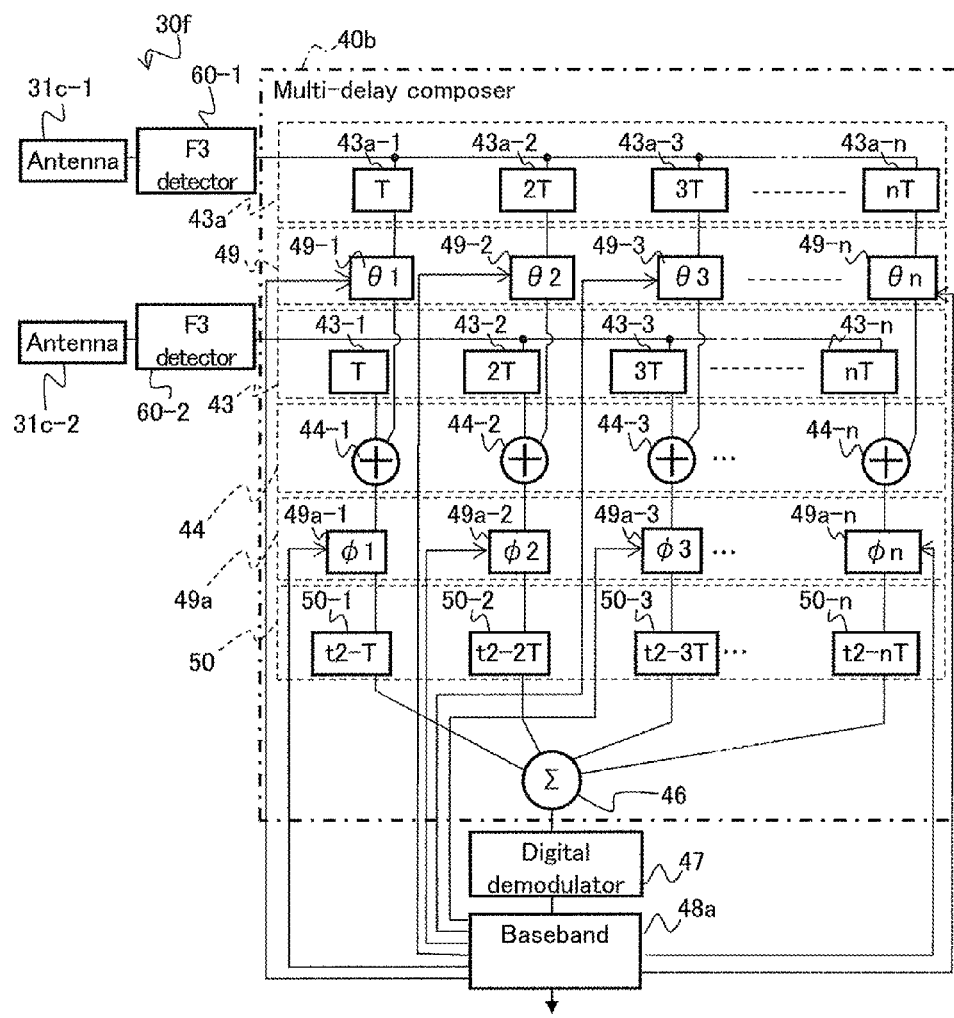
FIG. 13 is a general block diagram of a multi-delay composition circuit according to a seventh embodiment.

FIG. 13 is a general block diagram of a multi-delay composition circuit according to a seventh embodiment. The components in the drawing that are common to those in FIG. 11 showing the sixth embodiment are given the same reference numerals.

A wireless receiver 30g of this embodiment has substantially the same structure as the wireless receiver 30f of the sixth embodiment, except that the wireless receiver 30g includes a digital demodulation circuit 47 different from the digital demodulation circuit 47a in the wireless receiver 30f of the sixth embodiment and a baseband circuit 48a different from the baseband circuit 48 in the wireless receiver 30f of the sixth embodiment.

The baseband circuit 48a has the function of controlling the correction amounts of the phase shifts θ1 to θn of the polarization plane caused by reflection of the electromagnetic wave and the correction amounts of the phase shifts Φ1 to Φn due to electromagnetic wave path differences.

(Operation of the Seventh Embodiment)

How the wireless receiver 30g of the seventh embodiment operates is explained below in reference to FIG. 12.

At a timing T1 as the training period, the wireless transmitter 10 transmits a training signal. The training signal is transmitted over the transmission path. At a timing R1, the baseband circuit 48a of the wireless receiver 30g receives the training signal, and optimizes the correction amounts of the phase shifts θ1 to θn of the polarization plane caused by reflection of the electromagnetic wave and the correction amounts of the phase shifts Φ1 to Φn due to electromagnetic wave path differences in such a manner as to minimize the error rate of the composed received signals.

(Advantageous Effects of the Seventh Embodiment)

The seventh embodiment explained above offers the following advantageous effect (O):

(O) In the training period, the correction amounts of the phase shifts θ1 to θn of the polarization plane caused by reflection of the electromagnetic wave and the correction amounts of the phase shifts Φ1 to Φn due to electromagnetic wave path differences are optimized. This makes it possible to minimize the error rate due to radio wave interference following demodulation even if the path of the electromagnetic wave from the wireless transmitter 10 to the wireless receiver 30f varies dynamically in a changing installation environment.

(Structure of the Eighth Embodiment)

Figure 14:
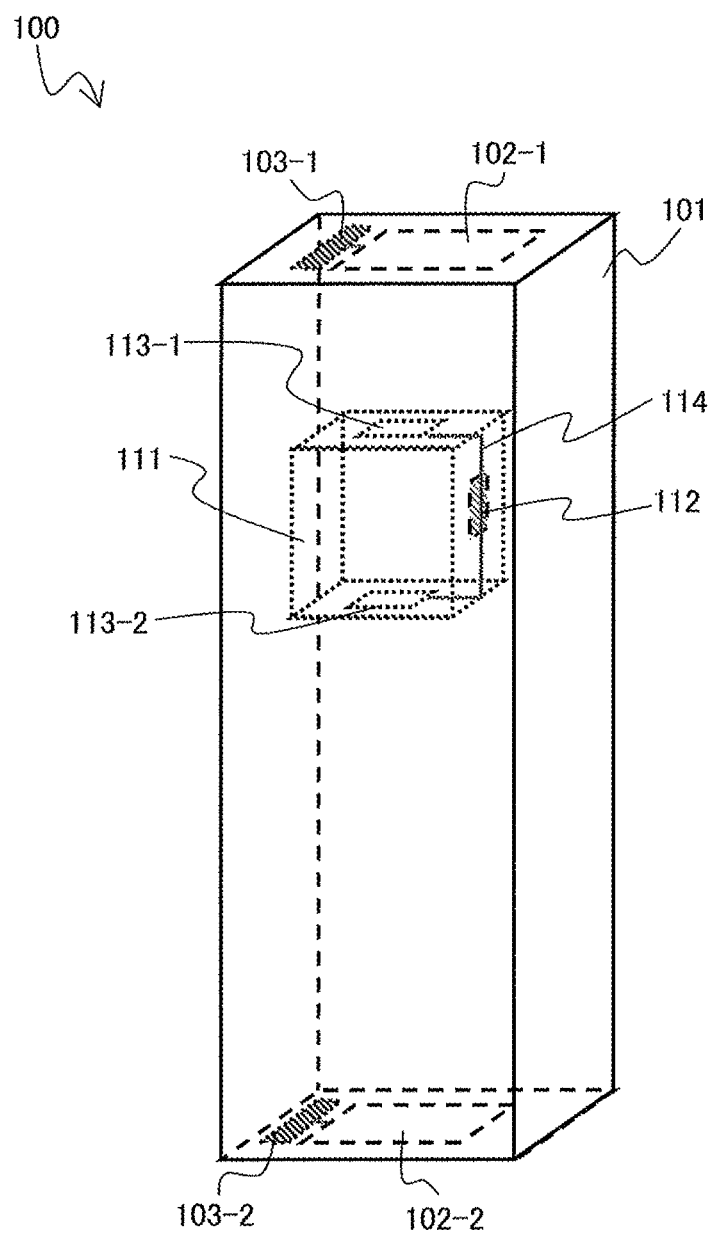
FIG. 14 is a general block diagram of an elevator system according to an eighth embodiment.

FIG. 14 is a general block diagram of an elevator system according to an eighth embodiment.

This elevator system 100 includes a building 101 making up an elongated rectangular solid and an elevator cage 111. Inside the building 101 is a space in which the elevator cage 111 moves up and down. The elevator cage 111 is lifted and lowered in the internal space the building 101 by means of ropes and a drive mechanism, not shown.

A base station wireless device 102-1 and an antenna 103-1 are attached to a ceiling part in the internal space of the building 101, and a base station wireless device 102-2 and an antenna 103-2 are installed on a floor part in the internal space of the building 101. The base station wireless devices 102-1 and 102-2 are each a polarization-angle-division diversity wireless device of which the structure is similar to that of the wireless receiver 30c shown in FIG. 8B. The antennas 103-1 and 103-2 are each an orthogonal polarization integral antenna similar to the receiving antenna 31c shown in FIG. 8B.

An antenna 113-1 is attached to the top of the elevator cage 111 and an antenna 113-2 is installed on the bottom thereof, the antennas being connected to a terminal wireless device 112 by means of a high-frequency cable 114. The terminal wireless device 112 is a polarization-angle-division diversity wireless device similar to the wireless transmitter 10*d* shown in FIG. 8A. The antennas 113-1 and 113-2 are each an orthogonal polarization integral antenna similar to the transmitting antenna 20*c* shown in FIG. 8A.

(Operation of the Eighth Embodiment)

The radio wave emitted by the terminal wireless device 112 is transmitted by way of the antennas 113-1 and 113-2. The transmitted radio wave propagating through the internal space of the building 101 undergoes multiple reflections by the inner walls of the building 101 and by the outer walls of the elevator cage 111. That is, the internal space of the building 101 constitutes a multiple wave interference environment. After undergoing the multiple reflections, the radio wave reaches the antennas 103-1 and 103-2.

By using polarization-angle-division diversity, this embodiment provides high-quality wireless transmission even in the multiple wave interference environment. Because the wireless connecting means allows the elevator cage 111 to be controlled and monitored from the building 101, there is no need to set aside a space to be occupied by wired connecting means such as cables wastefully taking up part of the internal space in which the elevator cages 111 moves up and down. This makes it possible either to reduce the volume of the building 101 or to increase the size of the elevator cage 111 given the same volume of the building 101 thereby raising the transport capability of the elevator.

At the same time, the elevator cage 111 can be made lightweight. That is because the wired connecting means such as cables to be connected to the elevator cage 111 can have a non-negligible weight in a high-rise building.

(Advantageous Effects of the Eighth Embodiment)

The eighth embodiment explained above offers the following advantageous effect (P):

(P) Because the wireless connecting means allows the elevator cage 111 to be controlled and monitored from the building 101, there is no need to allow for a space to be occupied by wired connecting means such as cables wastefully taking up part of the internal space in which the elevator cages 111 moves up and down. This makes it possible either to reduce the volume of the building 101 or to increase the size of the elevator cage 111 given the same volume of the building 101 thereby increasing the transport capability of the elevator.

(Structure of the Ninth Embodiment)

Figure 15:
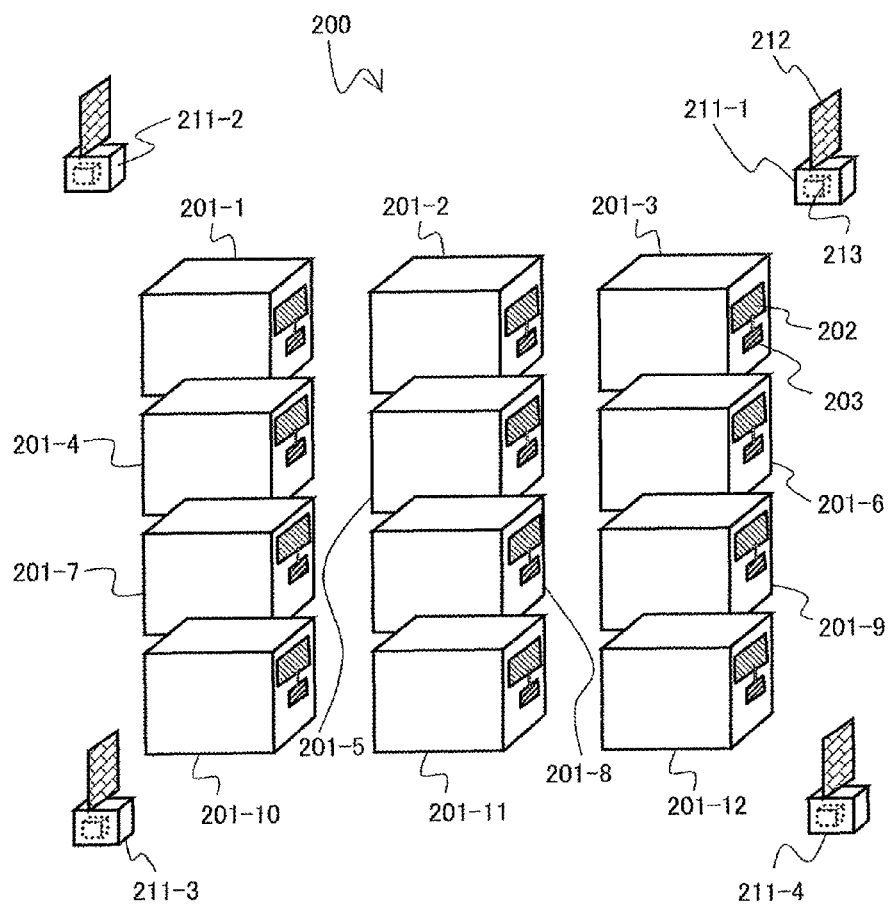
FIG. 15 is a general block diagram of a transformation installation monitoring system according to a ninth embodiment.

FIG. 15 is a s a general block diagram of a transformation installation monitoring system according to a ninth embodiment.

The transformation installation monitoring system 200 of this embodiment includes a plurality of transformation devices 201-1 to 201-12 and a plurality of wireless base stations 211-1 to 211-4 set up nearby. With this embodiment, the number of the transformation devices 201-1 to 201-12 is larger than that of the wireless base stations 211-1 to 211-4.

The transformation devices 201-1 to 201-12 each have a terminal wireless device 203 that provides polarization-angle-division diversity and an orthogonal polarization integral antenna 202. The transformation devices 201-1 to 201-12 each have dimensions on the order of several meters.

The wireless base stations 211-1 to 211-4 each have a base station wireless device 213 that provides polarization-angle-division diversity and an orthogonal polarization integral antenna 212. The transformation devices 201-1 to 201-12 have dimensions that are overwhelmingly larger than the wavelengths of electromagnetic waves which are used by wireless devices and which have frequencies ranging from hundreds of MHz to several GHz.

(Operation of the Ninth Embodiment)

In the transformation installation monitoring system 200 of this embodiment, the electromagnetic wave undergoes multiple reflections by the multiple transformation devices 201-1 to 201-12. The transformation installation monitoring system 200 thus incurs a multiple wave interference environment.

Thanks to their polarization-angle-division diversity function, the terminal wireless devices 203 and base station wireless devices 213 of this embodiment implement high-quality wireless transmission between them even in the multiple wave interference environment, so that the multiple wireless base stations 211-1 to 211-4 provide remote control and remote monitoring of the transformation devices 201-1 to 201-12. This resolves the problem of high-voltage dielectric power where cables or the like are employed, eliminates the cost of cable installation, and improves the security of a control/monitoring system for the transformation devices 201-1 to 201-12 while reducing their cost.

(Advantageous Effects of the Ninth Embodiment)

The ninth embodiment explained above offers the following advantageous effect (Q):

(Q) The polarization-angle-division diversity wireless devices of this embodiment permit high-quality wireless transmission even in the multiple wave interference environment. The multiple wireless base stations 211-1 to 211-4 provide remote control and remote monitoring of the transformation devices 201-1 to 201-12. This resolves the problem of high-voltage induced power incurred where wired connecting means such as cables are utilized, eliminates the cost of cable installation, and enhances the security of the control/monitoring system for the transformation devices 201-1 to 201-12 while reducing their cost.

(Modifications)

The present invention is not limited to the above-described embodiments, and modifications may be made without departure from the sprit of the present invention. The utilization forms and variations of this invention include the following examples (a) to (b):

(a) The wireless receiver 30*a* of the second embodiment has six receiving antennas 31-1 to 31-6. Alternatively, there may be provided as many as n (n is a natural number) receiving antennas. In this case, the delay amount T should preferably be $((1/f3) \div n)$, a value allowing the rotation cycle $(1/f3)$ of the electromagnetic wave polarization plane to be evenly sampled. As another alternative, the delay amount should preferably be $(((1/f3) \div 2) \div n)$, a value allowing half the rotation cycle $((1/f3) \div 2)$ of the electromagnetic wave polarization plane to be evenly sampled.

(b) The wireless transmitter 10*d* of the fifth embodiment has the transmitting antenna 20*c*-1 as the first transmitting antenna and the transmitting antenna 20*c*-2 as the second transmitting antenna for transmitting circularly polarized waves. Alternatively, the first transmitting antenna may transmit a linearly polarized wave, and the second transmitting antenna may transmit another linearly polarized wave having a predetermined angle (85 to 95 degrees) with the linearly polarized wave transmitted by the first transmitting antenna.

(c) The polarization-angle-division diversity wireless transmitters and receivers of this invention may be applied to wireless communication between central control equipment on the one hand and door sensors, window sensors and the like on the other hand in a security system. This makes it possible to provide security systems required to have a high communication quality.

DESCRIPTION OF REFERENCE SYMBOLS

- 10, 10b, 10c, 10d Wireless transmitter
- 11 Information generation circuit
- 12, 12-1, 12-2 Oscillator
- 13, 13-1 Modulator (first modulating means)
- 13-2 Modulator (fourth modulating means)
- 14 Motor (rotating means)
- 15 Phase shift circuit (phase shift means)
- 15b Phase inversion circuit
- 16 Oscillator
- 17 Baseband circuit
- 18-1 Modulator (second modulating means)
- 18-2 Modulator (third modulating means)
- 19-1 Adder (first composing means)
- 19-2 Adder (second composing means)
- 20 Transmitting antenna (electromagnetic wave transmitting means)
- 20b-1, 20c-1 Transmitting antenna (first transmitting antenna)
- 20b-2, 20c-2 Transmitting antenna (second transmitting antenna)
- 30, 30a, 30b, 30c, 30d, 30e Wireless receiver
- 31 Diversity receiving antenna
- 31b-1, 31c-1 Receiving antenna (first receiving antenna)
- 31b-2, 31c-2 Receiving antenna (second receiving antenna)
- 32-1 to 32-6 Path difference phase shifter (a plurality of signal correcting means)
- 33 Composer (composing means)
- 34-1 to 34-6 Delay devices
- 35-1 to 35-6 Delay devices
- 37 Time division switch
- 37a Input side switch
- 37b Output side switch
- 40, 40a Multi-delay composition circuit (multi-delay composing means)
- 42 (=42-1 to 42-n) Reflection phase shift delay device
- 43 (=43-1 to 43-n), 43a (=43a-1 to 43a-n) Delay device
- 44-1~44-n Adder
- 45 (=45-1 to 45-n) Path difference phase shift delay device
- 46 Composer
- 47, 47a Digital demodulation circuit
- 48, 48a Baseband circuit
- 49 (=49-1 to 49-n) Reflection phase shifter
- 49a (=49a-1 to 49a-n) Path difference phase shifter
- 50 (=50-1 to 50-n) Delay device
- 60-1 Rotational frequency detection circuit (first rotational frequency detecting means)
- 60-2 Rotational frequency detection circuit (second rotational frequency detecting means)
- 61 Rectification circuit
- 62 Low-pass filter
- 63 A/D converter

The invention claimed is:

1. A polarization-angle-division diversity wireless transmitter comprising:
an electromagnetic wave transmitter to transmit first and second independent linearly polarized waves,
wherein the electromagnetic wave transmitter comprises:
a first modulator to modulate an information signal having a first frequency by a carrier having a second frequency to output a first modulated signal;
a second modulator to modulate the first modulated signal by a third frequency to obtain a first output signal;
a first transmitter which transmits the first output signal using a first polarization-angle-division diversity wireless transmitter;
a phase shifter to shift a phase of the third frequency to have a phase difference of 90 degrees;
a third modulator to modulate the first modulated signal by the phase-shifted third frequency to obtain a second output signal; and
a second transmitter which transmits the second output signal using a second polarization-angle-division diversity wireless transmitter,
wherein the first frequency is set to be lower than the second frequency and the third frequency, and the second frequency is set to be higher than the third frequency, and
wherein the first and second transmitted output signals create the first and second linearly polarized waves having planes indicated by waveforms of the second frequency rotating on an x-y plane at the third frequency.

2. A polarization-angle-division diversity wireless receiver for receiving linearly polarized signals transmitted from a polarization-angle-division diversity wireless transmitter including:
a first modulator modulating an information signal having a first frequency by a second frequency to output a first modulated signal;
a phase shifter to shift a phase of the third frequency to have a phase difference of 90 degrees; and
an electromagnetic wave transmitter transmitting the first modulated signal using first and second independent polarized waves which are modulated by the third frequency and the phase-shifted third frequency, respectively,
wherein the first frequency is set to be lower than the second frequency and the third frequency, and the second frequency is set to be higher than the third frequency wherein the transmitted first modulated signal creates the linearly polarized waves having planes indicated by waveforms of the second frequency rotating on an x-v plane at the third frequency
the polarization-angle-division diversity wireless receiver comprising:
a plurality of antennas which receive the linearly polarized waves from the polarization-angle-division diversity wireless transmitter on a plurality of polarization planes to obtain a plurality of input signals;
a plurality of signal correctors correcting the input signals for phase shifts caused by path differences so as to generate a plurality of received signals, respectively; and
a composer composing the plurality of received signals.

* * * * *